United States Patent
Sugeno et al.

(10) Patent No.: US 9,878,634 B2
(45) Date of Patent: *Jan. 30, 2018

(54) POWER RESERVE APPARATUS, POWER SYSTEM, AND ELECTRIC VEHICLE

(71) Applicant: Sony Corporation, Tokyo (JP)

(72) Inventors: Naoyuki Sugeno, Fukushima (JP); Morihiko Sato, Kanagawa (JP); Koji Umetsu, Miyagi (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,254

(22) Filed: Jan. 23, 2017

(65) Prior Publication Data

US 2017/0144565 A1  May 25, 2017

Related U.S. Application Data

(63) Continuation of application No. 14/365,870, filed as application No. PCT/JP2012/083176 on Dec. 17, 2012, now Pat. No. 9,620,968.

(30) Foreign Application Priority Data

Dec. 26, 2011 (JP) .................. 2011-282839

(51) Int. Cl.
*H02J 17/00* (2006.01)
*B60L 11/18* (2006.01)
(Continued)

(52) U.S. Cl.
CPC ....... *B60L 11/1866* (2013.01); *B60L 11/1861* (2013.01); *H01M 10/441* (2013.01);
(Continued)

(58) Field of Classification Search
USPC ......................................... 320/112
See application file for complete search history.

(56) References Cited

U.S. PATENT DOCUMENTS 5,594,320 A    1/1997 Pacholok et al.
9,620,968 B2 *  4/2017 Sugeno ............... H01M 10/441
(Continued)

FOREIGN PATENT DOCUMENTS

CN    101606299 A    12/2009
DE    19533543 A1    3/1996
(Continued)

OTHER PUBLICATIONS

Chinese Office Action dated Jan. 12, 2016, for corresponding Chinese application No. 201280063113.5 (19 pages).
(Continued)

*Primary Examiner* — Mohammed Alam
(74) *Attorney, Agent, or Firm* — K&L Gates LLP

(57) ABSTRACT

A power reserve apparatus is disclosed. In one embodiment, the power reserve apparatus comprises a first module including a first set of battery cells and a first inter-cell balance adjustment unit configured to use passive balancing to reduce voltage variance among the first set of battery cells. The power reserve apparatus also comprises a second module including a second set of battery cells and a second inter-cell balance adjustment unit configured to use passive balancing to reduce voltage variance among the second set of battery cells. The power reserve apparatus further comprises an inter-module balance adjustment unit configured to use active balancing to reduce voltage variance among the first and second modules.

9 Claims, 21 Drawing Sheets

(51) Int. Cl.
*H02J 7/00* (2006.01)
*H01M 10/48* (2006.01)
*H01M 10/44* (2006.01)
*H01M 10/42* (2006.01)

(52) U.S. Cl.
CPC ......... *H01M 10/482* (2013.01); *H02J 7/0019* (2013.01); *H02J 7/0021* (2013.01); *H01M 2010/4271* (2013.01); *H01M 2220/20* (2013.01)

(56) References Cited

U.S. PATENT DOCUMENTS

| | | | |
|---|---|---|---|
| 2008/0088279 | A1 | 4/2008 | Lim et al. |
| 2011/0140662 | A1* | 6/2011 | Li ................. H02J 7/0016 320/116 |
| 2011/0241622 | A1* | 10/2011 | Li ................. H01M 10/42 320/116 |
| 2011/0309796 | A1* | 12/2011 | Firehammer ...... H02J 7/0018 320/118 |
| 2013/0002203 | A1* | 1/2013 | Kuraishi ........... H02J 7/0019 320/134 |
| 2013/0328529 | A1* | 12/2013 | Zbrozek ........... H02J 7/0016 320/118 |
| 2014/0266003 | A1 | 9/2014 | Biskup |
| 2014/0306662 | A1 | 10/2014 | Kim et al. |
| 2016/0181837 | A1* | 6/2016 | Shu ................. H02J 7/0016 320/119 |

FOREIGN PATENT DOCUMENTS

| | | |
|---|---|---|
| DE | 102008043593 A1 | 5/2010 |
| DE | 102010029460 A1 | 12/2011 |
| JP | 2006-254535 A | 9/2006 |
| JP | 2008-035680 A | 2/2008 |
| JP | 2008-271708 A | 11/2008 |
| JP | 2009-504130 A | 1/2009 |
| JP | 2010-098824 A | 4/2010 |
| JP | 2010-142039 A | 6/2010 |
| WO | 2011/034957 A2 | 3/2011 |
| WO | 2011/070517 A1 | 6/2011 |

OTHER PUBLICATIONS

Japanese Office Action dated Jul. 14, 2015, for corresponding Japanese application No. 2011-282839 (6 pages).

* cited by examiner

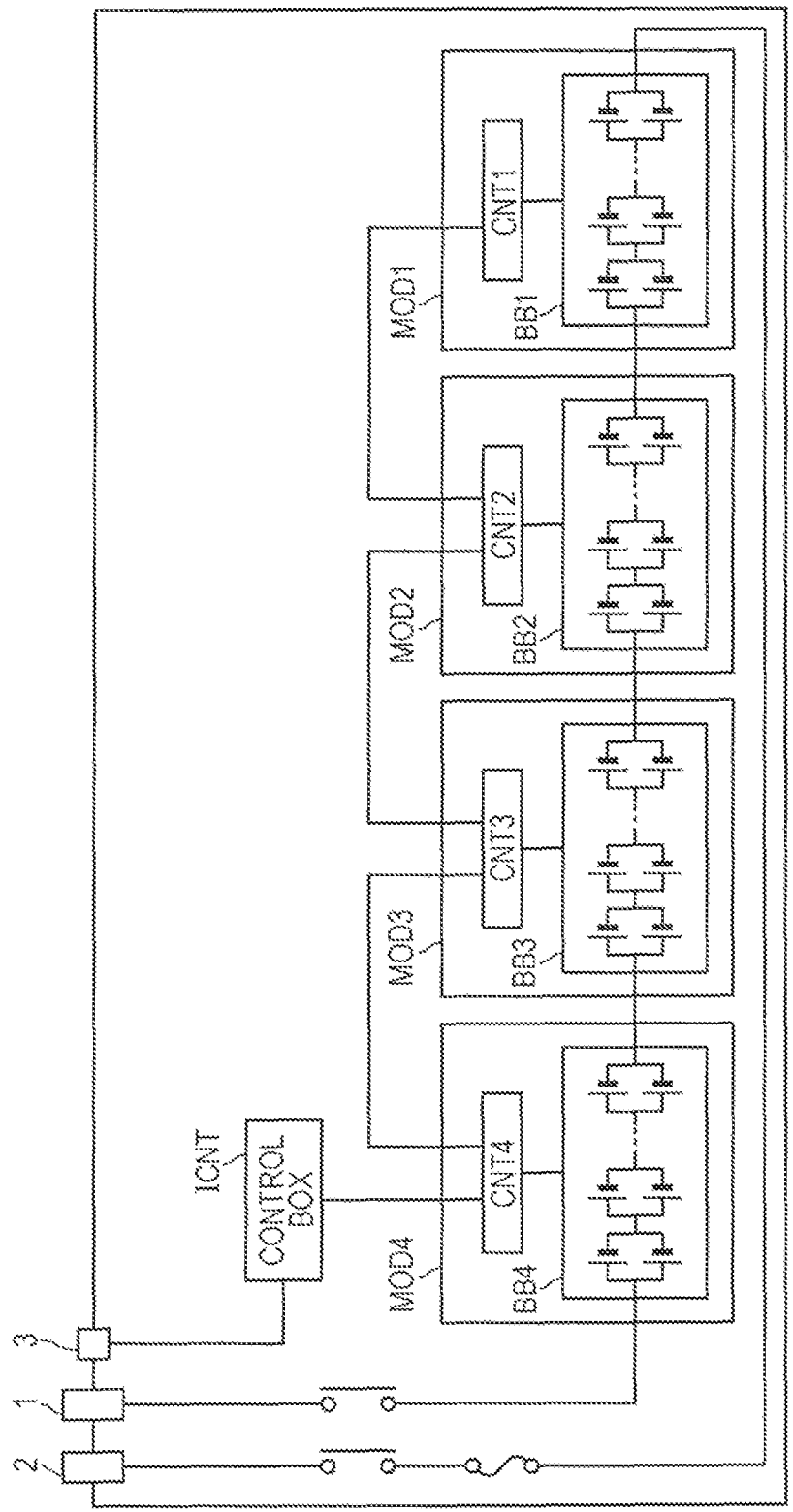

FIG. 9A  S3  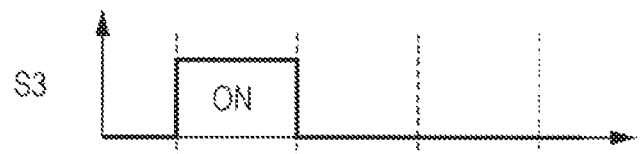
FIG. 9B  SO3  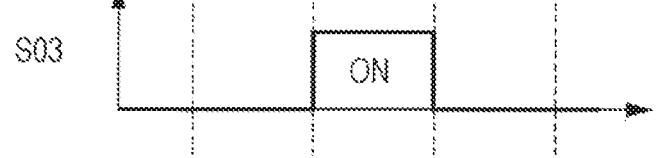
FIG. 9C  SO2  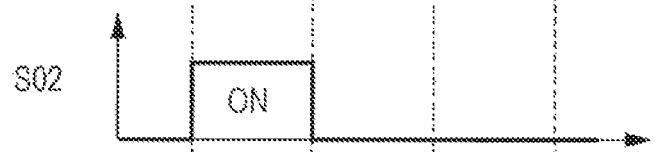
FIG. 9D  S2  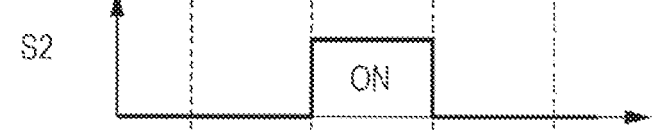
FIG. 9E  i1  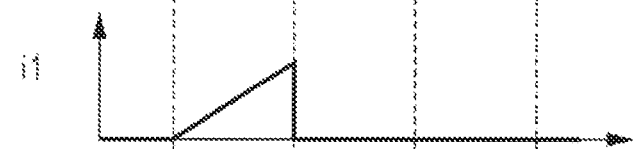
FIG. 9F  i2  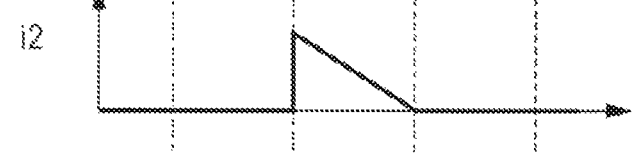
FIG. 9G  i3  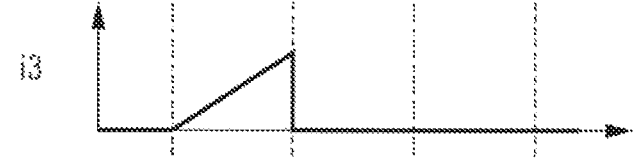
FIG. 9H  i4  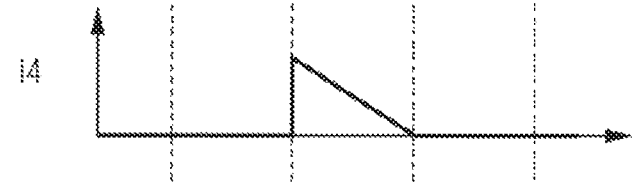

POWER RESERVE APPARATUS, POWER SYSTEM, AND ELECTRIC VEHICLE

CROSS-REFERENCE TO RELATED APPLICATIONS

The present application is a continuation of U.S. application Ser. No. 14/365,870, filed Jun. 16, 2014, which is a national stage of International Application No. PCT/JP2012/083176, filed Dec. 17, 2012 and claims priority to Japanese Application No. 2011-282839, filed on Dec. 26, 2011, the disclosures of which are incorporated herein by reference.

BACKGROUND

The present disclosure relates to a power reserve apparatus, a power system, and an electric vehicle that utilizes power from the power reserve apparatus.

In these years, the usage of a secondary battery such as a lithium-ion battery is rapidly expanding to a power storage apparatus for reserving power and a power storage battery for a car combined with a new energy system such as a solar cell or wind power generation, and the like. When a large number of power storage elements such as, for example, unit batteries (also called electric batteries or cells; in the following description, referred to as battery cells as necessary) are used to generate high power, a configuration in which a plurality of power storage modules are connected in series with one another is adopted. In the power storage modules, a plurality of, that is, for example, four, battery cells are connected parallel to, and/or in series with, one another to configure a battery block. A large number of battery blocks are stored in a protection case to configure a power storage module (also called an assembled battery).

Furthermore, a battery system is known in which a plurality of power storage modules are connected to one another and a common control apparatus is provided for the plurality of power storage modules. In this configuration, each power storage module includes a module controller, and the module controller and the common control apparatus communicate with each other through communication means.

In the case of using a plurality of battery cells, even when one of the plurality of battery cells has reached a lower limit of working voltage during discharging, other battery cells may not have still reached the lower limit of the working voltage due to differences in self-discharge between the battery cells or the like. When the battery cells are charged again in such a state, some battery cells cannot be fully charged, thereby posing a problem in that the capacity of these battery cells cannot be fully utilized.

In order to correct variation in voltage between the plurality of battery cells, an equalization process for controlling the balance between the battery cells is performed. Because a power reserve apparatus includes an extremely large number of battery cells in the case of an on-vehicle battery, a domestic power storage apparatus, or the like, there has been a problem in that it takes a long time to equalize the voltages of all the battery cells.

By intra-module equalization (inter-cell voltage adjustment), in which a process for equalizing the voltages of the battery cells is performed for each power storage module, and inter-module equalization (inter-module voltage adjustment), in which a process for equalizing the voltages of the power storage modules is performed, it is possible to reduce the time taken to complete the equalization.

As a configuration for equalizing the voltages of a plurality of battery cells in a power storage module in which the plurality of battery cells are connected to one another, a voltage balance circuit (referred to as the passive balance adjustment circuit) is known in which a resistor and a switching element are connected parallel to each cell and that causes a battery cell whose voltage is high to discharge. Furthermore, in a power reserve apparatus in which a plurality of power storage modules are connected to one another, a configuration is known in which, as with the above example, a resistor element and a switching element are used to equalize the voltages of the power storage modules.

However, when voltage is equalized by resistors, the voltages of the battery cells and the power storage modules undesirably decrease as a whole, and therefore a large number of times of charging and a large number of times of discharging for adjusting the voltages need to be repeated in order to set these voltages to a target value. Therefore, it takes a long time to complete the voltage adjustment of the power reserve apparatus. Especially when there is cyclic deterioration of a positive/negative active material, variation in the temperature condition, or a decrease in the amount of power in a battery cell according to an increase in internal resistance, the balance between the amounts of power in the battery cells is lost to a great extent and it takes a longer time to complete the voltage adjustment. Furthermore, the variation of the battery cells cannot be adjusted between the modules, and it is difficult to keep the balance.

On the other hand, a circuit (referred to as an active balance adjustment circuit) has been proposed that equalizes voltage using coils and switching elements. In a circuit configuration that equalizes voltage by moving electric charge using coils, voltage can be equalized in a relatively short period of time, but the arrangement of the coils and the switching elements and the control of the switching elements are complex, and a large number of coils need to be arranged in such a way as to enable smooth transmission of power.

For example, in Patent Literature 1, a large number of battery cells are divided into a plurality of series cell groups, while providing an inter-cell voltage balance correction circuit for each cell group and an inter-group voltage balance correction circuit. The inter-cell balance correction circuit equalizes the voltages of cells in each cell group using inductors and switching elements. The inter-group voltage balance correction circuit has a configuration in which the balance between the series voltages of the cell groups is corrected by alternating-current coupling formed by transformer coils and switching circuits.

CITATION LIST

Patent Literature

PTL 1: Japanese Unexamined Patent Application Publication No. 2008-035680

SUMMARY

Technical Problem

The inter-group voltage balance correction circuit described in Patent Literature 1 can be applied to correction of the balance between batteries in power storage modules. However, a coil is configured to be connected to each cell group (for example, two battery cells). The coils are configured to be wound on the same magnetic core. Therefore, when the inter-group voltage balance correction circuit has been connected to a plurality of power storage modules stored in different cases, coils and magnetic cores need to be stored in the different cases. Because star-shaped wiring is adopted in which a plurality of power storage modules are connected to this different transformer apparatus, there is a problem in that connection becomes complex when the number of power storage modules increases. Furthermore, even if an extremely large number of battery cells are divided into cell groups, an extremely large number of inductors are needed when each group is configured by two cells. This results in an increase in the number of components, thereby causing the areas of circuit boards to increase.

Furthermore, because voltage is equalized by controlling the switching circuits in such a way as to turn on and off in the same phase, it is impossible to independently control the switching operation for each cell group. Therefore, there has been a problem in that power cannot be transmitted from a particular cell group whose voltage is high to a particular cell group whose voltage is low.

Therefore, an object of the present invention is to provide a power reserve apparatus, a power system, and an electric vehicle that can reduce the time taken to complete the voltage adjustment without requiring a large number of inductors.

Solution to Problem

In order to solve the above problem, the present disclosure includes a power reserve apparatus comprising a first module that includes a first set of battery cells and a first inter-cell balance adjustment unit configured to use passive balancing to reduce voltage variance among the first set of battery cells. The power reserve apparatus also comprises a second module that includes a second set of battery cells and a second inter-cell balance adjustment unit configured to use passive balancing to reduce voltage variance among the second set of battery cells. The power reserve apparatus further comprises an inter-module balance adjustment unit configured to use active balancing to reduce voltage variance among the first and second modules.

More preferably, in the present disclosure, the first module further includes a first battery monitoring unit configured to detect voltages of each of the battery cells within the first set and the second module further includes a second battery monitoring unit configured to detect voltages of each of the battery cells within the second set.

Additionally, in the present disclosure, the first module further includes a first control unit configured to determine which switches within the first inter-cell balance adjustment unit are to be switched to passively reduce voltage variance among the first set of battery cells based on the voltages detected by the first battery monitoring unit and the second module further includes a second control unit configured to determine which switches within the second inter-cell balance adjustment unit are to be switched to passively reduce voltage variance among the second set of battery cells based on the voltages detected by the second battery monitoring unit.

Further, in the present disclosure, the power reserve apparatus also includes a battery controller configured to receive a first cumulative voltage of the first set of battery cells within the first module from the first control unit, receive a second cumulative voltage of the second set of battery cells within the second module from the second control unit, and transmit control information to the first and second modules indicating which switches of the inter-module balance adjustment unit are to be switched to actively reduce voltage variance among the first and second modules.

In another embodiment, a power reserve method comprises detecting voltages of a first set of battery cells in a first module and detecting voltages of a second set of battery cells in a second module. The method also comprises determining a first cumulative voltage of the first module based on the voltages of the first set of battery cells and determining a second cumulative voltage of the second module based on the voltages of the second set of battery cells. The method further comprises controlling a first group of switches to actively balance the cumulative voltages among the first and second modules and controlling a second group of switches to passively balance voltages among the battery cells within the first module and voltages among battery cells within the second module.

In another embodiment, a electric vehicle comprises a power reserve apparatus that includes a first module including a first set of battery cells and a first inter-cell balance adjustment unit configured to use passive balancing to reduce voltage variance among the first set of battery cells. The power reserve apparatus also includes a second module including a second set of battery cells and a second inter-cell balance adjustment unit configured to use passive balancing to reduce voltage variance among the second set of battery cells. The power reserve apparatus further includes an inter-module balance adjustment unit configured to use active balancing to reduce voltage variance among the first and second modules and a conversion apparatus configured to use power supplied from the power reserve apparatus to drive an engine and power vehicle control electronics.

Advantageous Effects of Invention

In the present disclosure, since inter-cell voltage adjustment (referred to as inter-cell balance adjustment or cell balance) is performed using passive balance control, the sizes of circuits and circuit boards can be reduced without requiring inductor elements. On the other hand, since inter-module voltage adjustment (referred to as inter-module balance adjustment or inter-module balance) is performed using active balance control, it is possible to prevent the overall voltage from decreasing. Furthermore, when the inter-module balance adjustment is performed, a difference in voltage larger than in the case of the inter-cell balance adjustment needs to be eliminated, and therefore when the inter-module balance adjustment is performed using the passive balance adjustment, the time taken to complete the balance adjustment becomes longer. Therefore, as in the present disclosure, by combining the inter-cell balance adjustment and the inter-module balance adjustment, the time taken to complete the balance adjustment is reduced.

Additional features and advantages are described herein, and will be apparent from the following Detailed Description and the figures.

BRIEF DESCRIPTION OF THE FIGURES

FIG. 1 is a block diagram of an example of a power reserve apparatus.

FIGS. 9A, 9B, 9C, and 9D are timing charts illustrating operations for turning on and off switches. FIGS. 9E, 9F, 9G, and 9H are waveform diagrams illustrating current flowing through coils.

DETAILED DESCRIPTION

Figure 2A:
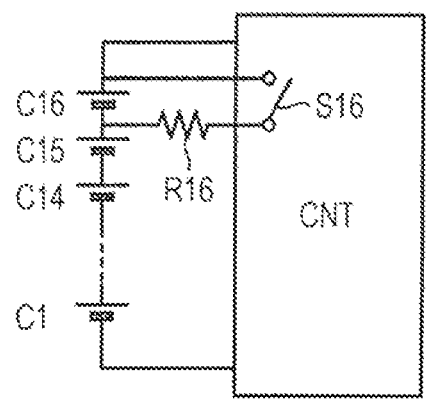
FIG. 2A is a block diagram illustrating passive balance adjustment.

Embodiments that will be described hereinafter are preferable specific examples of the present disclosure and various technologically preferable limitations are provided therefor, but the scope of the present disclosure is not limited to these embodiments in the following description unless description for limiting the present disclosure is specifically included.

"Power Reserve Apparatus"

When a large number of power storage elements, that is, for example, battery cells, are used to generate high power, a configuration is adopted in which a plurality of power storage units (hereinafter referred to as the power storage modules) are connected to one another and a control apparatus is provided for the plurality of power storage modules in common. Such a configuration is referred to as a power reserve apparatus.

Each power storage module is a unit obtained by combining a battery unit including a series connection of a plurality of battery cells, that is, for example, lithium-ion secondary batteries, or a series connection of a plurality of battery cells connected parallel to one another (a battery block) and a module controller provided for each module. Each module controller is connected to an overall control apparatus (hereinafter referred to as the control box as necessary), and the control box executes charge control, discharge control, control for suppressing deterioration, and the like. The module controllers and the control box are configured by microcomputers.

The module controller for each power storage module and the control box are connected to each other by a bus. As the bus, a serial interface is used. As the serial interface, more specifically, an SM bus (System Management Bus), a CAN (Controller Area Network), an SPI (Serial Peripheral Interface), or the like is used.

Each module controller and the control box communicate with each other. That is, information regarding the internal state of each power storage module, that is, battery information including information regarding the voltage of each battery cell and the voltage of the entirety of the module, information regarding current, and information regarding temperature, is transmitted from each module controller to the control box, in order to control a charging process and a discharging process of each power storage module.

FIG. 1 illustrates an example of a specific connection configuration of the power reserve apparatus. For example, four power storage modules MOD1 to MOD4 are connected in series with one another. In this case, for example, a positive terminal 1 (VB+) and a negative terminal 2 (VB−) obtain the overall output voltage of the power reserve apparatus, namely, for example, about 200 V. The power storage modules include module controllers CNT1 to CNT4 and battery units BB1 to BB4, respectively, in each of which a plurality of parallel connections of a plurality of battery cells or a plurality of battery blocks are connected to one another.

The module controllers CNT1 to CNT4 are connected to one another through buses, and a communication terminal of the module controller CNT4 is connected to a control box ICNT. Battery information regarding the voltage of each module and the like is transmitted from each module controller to the control box ICNT. The control box ICNT also includes a communication terminal 3, so that communication with the outside can be performed.

In an embodiment of the present disclosure, inter-cell balance adjustment in each module is performed using passive balance adjustment, and inter-module balance adjustment is performed using active balance adjustment. Since inter-cell voltage adjustment (referred to as the inter-cell balance adjustment) is performed using the passive balance adjustment, the sizes of circuits and circuit boards can be reduced without requiring inductor elements. On the other hand, since inter-module voltage adjustment (referred to as the inter-module balance adjustment) is performed using the active balance adjustment, it is possible to prevent the overall voltage from decreasing. By combining the inter-cell balance adjustment and the inter-module balance adjustment, the time taken to complete the balance adjustment can be reduced.

"Cell Balance"

In the present disclosure, by performing the inter-module balance adjustment on the above-described plurality of power storage modules MOD1 to MODn, the output voltages of the power storage modules are equalized. In general, because a large number of battery cells are included in each power storage module, variation between the power storage modules is large compared to voltage balance between the battery cells in each power storage module. Therefore, even if the inter-cell balance adjustment in each power storage module is to be performed, the inter-module balance adjustment is still significant in reducing the time taken to complete the balance adjustment.

Before describing the present disclosure, general passive balance adjustment will be described. As illustrated in FIG. 2A, for example, inter-cell balance adjustment for sixteen battery cells C1 to C16 will be examined A switch S16 for short-circuiting both ends of a cell and a resistor R16 are connected to each cell. In FIG. 2A, only the switch S16 and the resistor R16 for the battery cell C16 are illustrated for the purpose of simplification. Turning on and off of the switches is controlled by, for example, a controller CNT. The controller CNT detects the voltage of each cell.

Figure 2B:
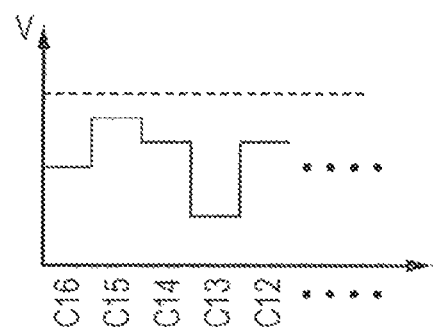
FIGS. 2B, 2C, and 2D are schematic diagrams illustrating the passive balance adjustment.
Figure 2C:
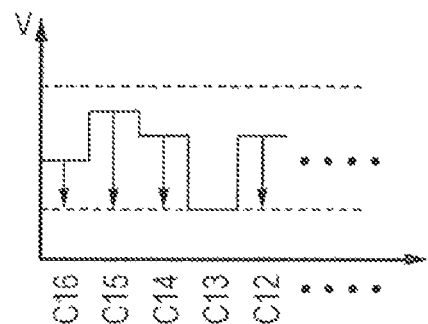

When any of the battery cells has reached an upper limit of working voltage during charging of the battery cells C1 to C16 that are discharging, the discharging ends. As illustrated in FIG. 2B, in this state, the voltages of the other battery cells are lower than the upper limit of the working voltage. For example, differences in the amount of self-discharge result in variation in the amount of discharge between the battery cells. As illustrated in FIG. 2C, the controllers CNT turn on the switches of the battery cells other than the battery cell C13, whose voltage is the lowest, so that these battery cells discharge through the respective resistors and the voltages of these battery cells match the voltage of C13.

Figure 2D:
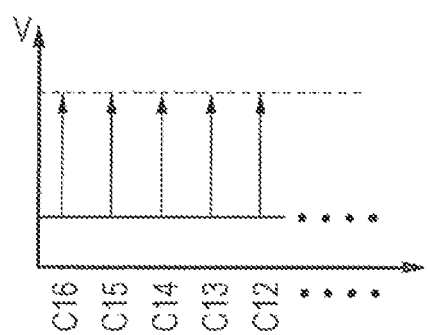

Thereafter, the battery cells C1 to C16 are charged again until the voltage of any of the battery cells C1 to C16 reaches the upper limit of the working voltage. The battery cells then discharge such that the voltages thereof match the lowest voltage at a time when the upper limit of the working voltage has been reached. By repeating such an operation, it is possible to increase the voltages of the battery cells C1 to C16 in such a way as to be substantially equal to the upper limit of the working voltage as illustrated in FIG. 2D, thereby preventing a decrease in the amount of discharge. The passive balance adjustment has a simple configuration, but there is a problem in that energy is discharged in vain.

Figure 3A:
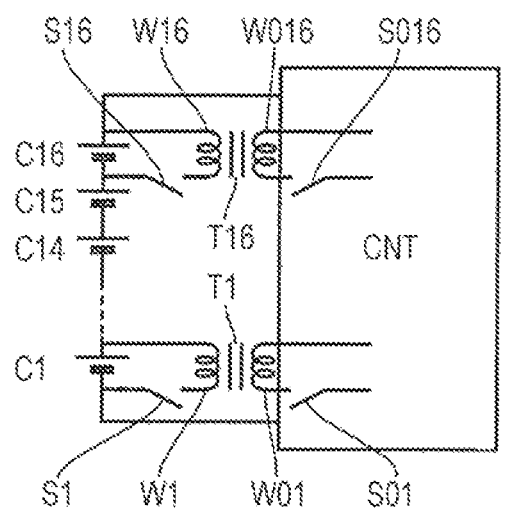
FIG. 3A is a block diagram illustrating active balance adjustment.

Next, the active balance adjustment will be described with reference to FIG. 3. In the present disclosure, flyback transformers T1 to T16 are connected to the battery cells, respectively, as illustrated in FIG. 3A. The flyback transformers T1 to T16 are configured by primary-side coils W1 to W16, secondary-side coils W01 to W016, and magnetic cores, respectively. The primary-side coils W1 to W16 and switches S1 to S16 are connected in series with each other, and the secondary-side coils W01 to W016 and switches S01 to S016 are connected in series with each other. In FIG. 3A, the flyback transformers T1 and T16, the switches S1 and S16, and the switches S01 and S016 for the battery cells C1 and C16, respectively, are illustrated.

In each of the flyback transformers T1 to T16, the winding ratio of the primary-side coil to the secondary-side coil has a certain value and the phase on the primary side is opposite to that on the secondary side. Furthermore, the flyback transformers T1 to T16 can transmit power in both directions. Therefore, denotation of the primary side and the secondary side is just for convenience, and both the transmission of power from the primary side to the secondary side and the transmission of power from the secondary side to the primary side are possible.

The switches S1 to S16 and the switches S01 to S016 are independently controlled by the controller CNT. By controlling the turning on and off of these switches, it is possible to transmit energy obtained from a desired battery cell to another battery cell. The controller CNT detects the voltage of each cell.

Figure 3B:
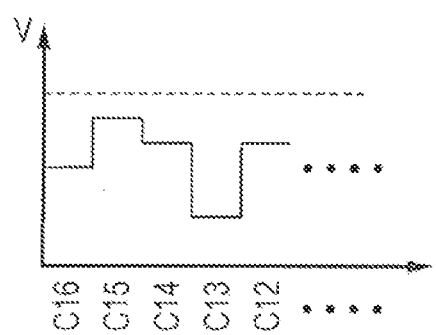
FIGS. 3B, 3C, and 3D are schematic diagrams illustrating the active balance adjustment.

When any of the battery cells has reached the upper limit of the working voltage during charging of the battery cells C1 to C16 that are discharging, the discharging ends. As illustrated in FIG. 3B, in this state, the voltages of the other battery cells are lower than the upper limit of the working voltage. For example, differences in the amount of self-discharge result in variation in the amount of discharge between the battery cells.

Figure 3C:
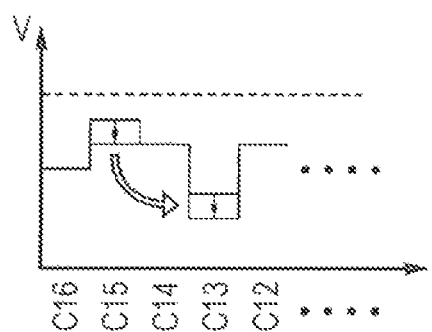
Figure 3D:
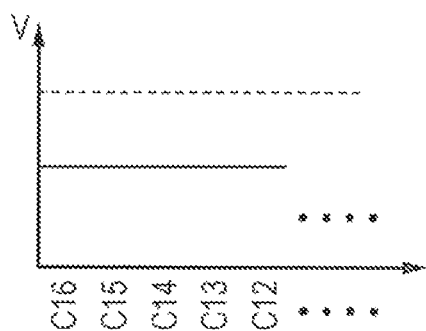

As illustrated in FIG. 3C, power is transmitted from the battery cell C15, whose amount of power is the largest (highest potential) when the upper limit of the working voltage has been reached, to the battery cell C13, whose amount of power is the smallest (lowest potential). As a result, as illustrated in FIG. 3D, the remaining amounts of power become substantially equal to one another. Thereafter, by charging the battery cells C1 to C16, all the battery cells can be charged substantially up to a full charge voltage. In practice, a plurality of processes are performed. Such control is referred to as the active balance adjustment. In comparison with the passive balance adjustment, the active balance adjustment can use the amounts of power effectively, which is preferable.

In the present disclosure, the above-described passive balance adjustment is applied to the inter-cell balance adjustment. As described above, the configuration of the inter-cell balance adjustment is a configuration in which the resistors and the switches are controlled in parallel with the battery cells to control the turning on and off of the switches. Furthermore, in the present disclosure, the active balance adjustment is applied to the inter-module balance adjustment.

Some examples of the configuration of the inter-module balance adjustment that can be used for the present disclosure will be described hereinafter.

Figure 4:
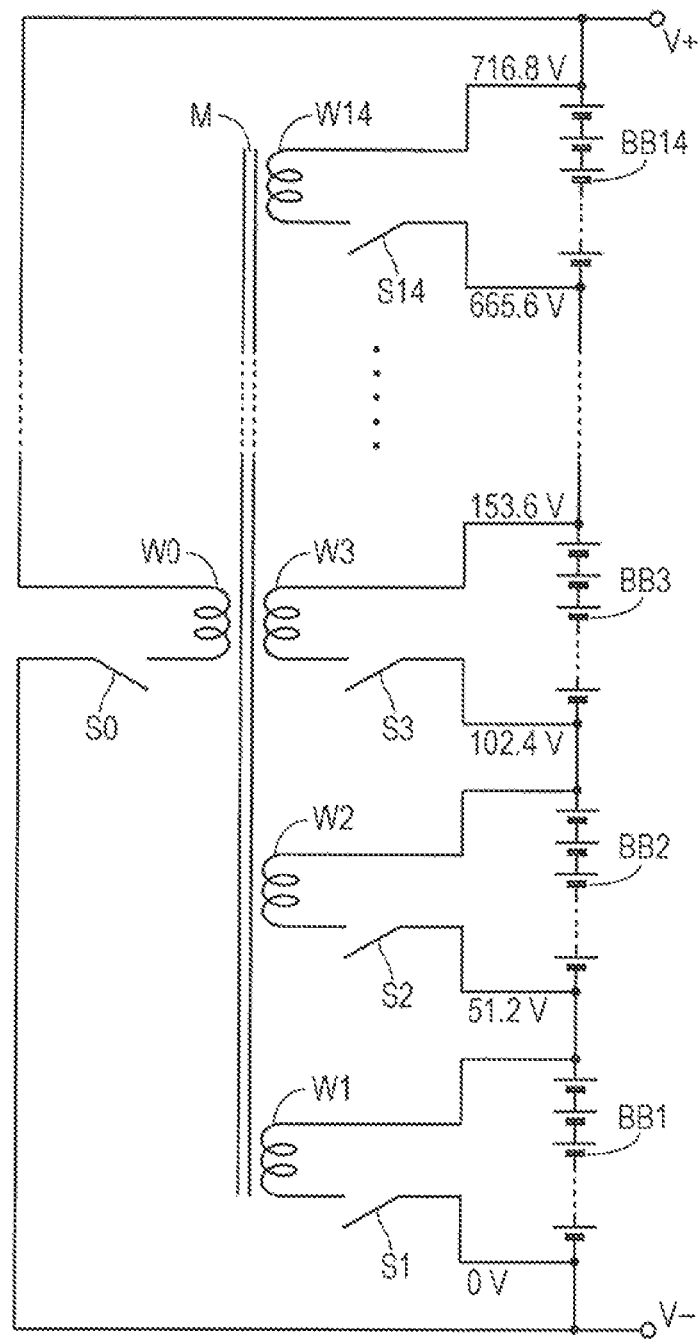
FIG. 4 is a connection diagram illustrating an example of an inter-module balance adjustment circuit having the same configuration as the related art.

FIG. 4 illustrates a circuit configuration in which an existing cell balance circuit is directly applied to an active inter-module balance adjustment circuit. For example, balance control is performed between fourteen power storage modules. Battery units BB1 to BB14 are connected in series with one another. Each battery unit has a configuration in which eight battery cells are connected parallel to one another and sixteen parallel connections (battery blocks) each including the eight battery cells are connected in series with one another (so-called (8P16S)). For example, each battery unit generates a voltage of (3.2 V×16=51.2 V). Therefore, the series connection of the fourteen battery units BB1 to BB14 generates a voltage of (51.2 V×14=716.8 V).

The positive side and the negative side of the series connection of the fourteen battery units are connected to both ends, respectively, of a secondary-side coil W0. Furthermore, a common magnetic core M is provided. Furthermore, a secondary-side switch S0 is connected in series with the secondary-side coil W9, and primary-side switches S1 to S14 are connected in series with primary-side coils W1 to W14, respectively. The switches S0 to S14 are, for example, configured by MOSFETs.

In an active balance adjustment operation using the configuration illustrated in FIG. 4, the switch connected to the primary-side coil of a battery unit whose voltage is the highest is turned on, and then the switch is turned off while the switch S0 is turned on to supply current to the secondary-side coil W0 and charge the battery units BB1 to BB14. For example, when the voltage of the battery unit BB2 is 56.5 V and the voltages of the other battery units are 55.9 V, the primary-side switch S2 is turned on for a certain period of time, and then the switch S2 is turned off while the secondary-side switch S0 is turned on. The battery units BB1 to BB14 (however, BB2 is excluded) are charged by the current flowing through the secondary-side coil W0.

In the configuration illustrated in FIG. 4, since the magnetic core M of transformers is used in common, it is difficult to configure a plurality of, namely, for example, fourteen, power storage modules, by storing the power storage modules in different cases. In this case, a transformer unit configured by the magnetic core, the coils, and the switches is stored in a different case from the fourteen power storage modules to configure a transformer apparatus, and the fourteen power storage modules are connected to the transformer apparatus in a star shape having the transformer apparatus as its center. Such a star-shaped configuration has a problem in that star-shaped wiring becomes complex when the number of power storage modules is large.

Furthermore, in the configuration illustrated in FIG. 4, a voltage of 716.8 V is applied to the series circuit including the secondary-side coil W0 and the switch S0 by the fourteen battery units connected in series with one another. Because withstand voltage required in practical use is considered to be three times as large as applied voltage, the withstand voltage of a semiconductor switch element that configures the switch S0, such as an FET, is supposed to be 2000 V or more. The configuration illustrated in FIG. 4, which requires a semiconductor switch element having such a withstand voltage, is difficult to realize. Therefore, the circuit configuration illustrated in FIG. 4 can be used for the inter-module balance adjustment, but this configuration is not preferable.

Figure 5:
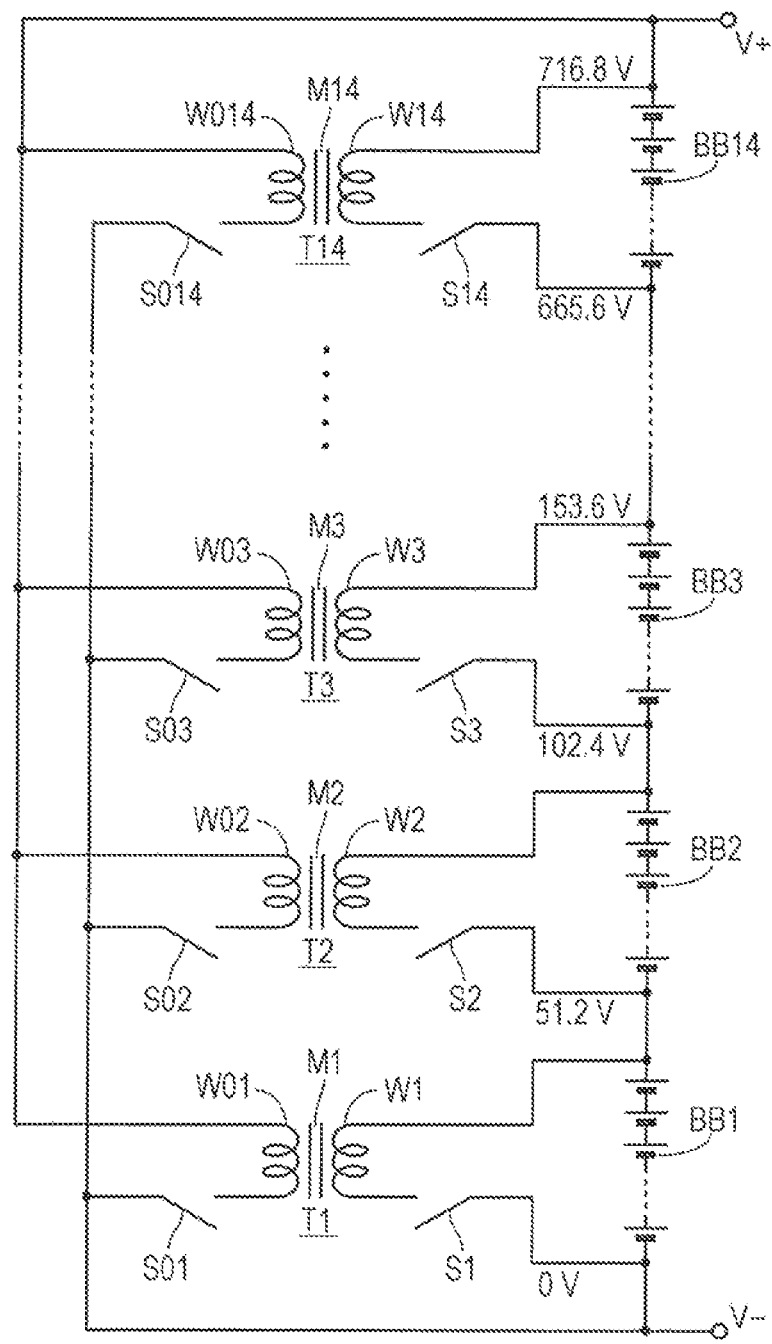
FIG. 5 is a connection diagram illustrating a first example of the inter-module balance adjustment circuit.

FIG. 5 illustrates a first example of an inter-module balance adjustment circuit. As illustrated in FIG. 5, the magnetic core M is divided into fourteen magnetic cores M1 to M14, and the secondary-side coil W0 is divided into fourteen secondary-side coils W01 to W014. In doing so, the fourteen power storage modules can be separated and stored in cases. In the configuration illustrated in FIG. 5, a voltage of 716.8 V is applied to each of the primary-side switches S01 to S014. However, in the configuration illustrated in FIG. 5, flyback transformers T1 to T14 are configured separately, and the primary-side and secondary-side switches can independently control switching operations since the primary-side and secondary-side switches are connected to the respective coils. Therefore, as will be described later, it is possible to perform control in such a way as to obtain power from the plurality of battery units at the same time and to supply power to the plurality of battery units at the same time. Furthermore, by controlling the lengths of the on periods in the switching operations, the amounts of power can be controlled.

Figure 6:
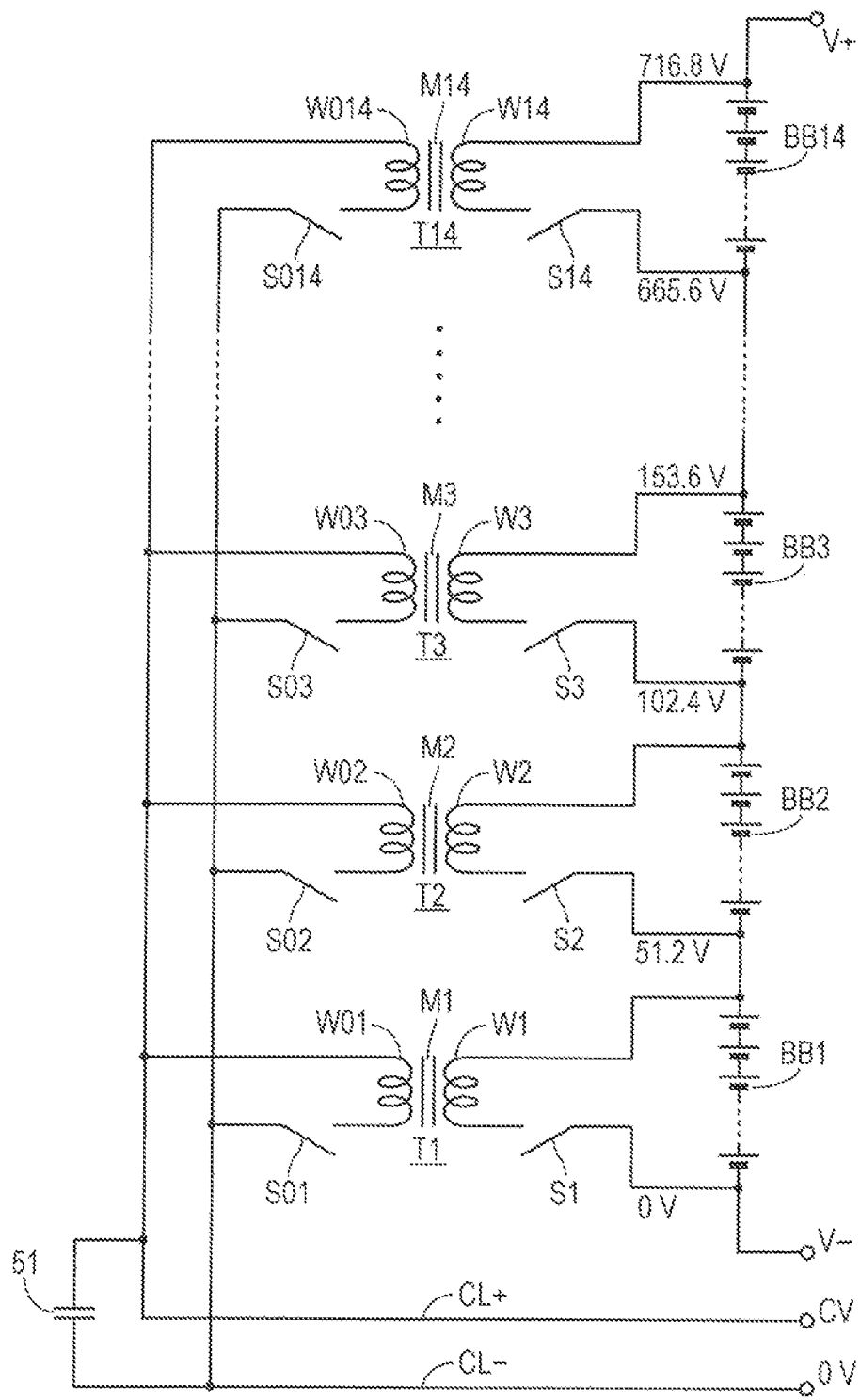
FIG. 6 is a connection diagram illustrating a second example of the inter-module balance adjustment circuit.

FIG. 6 illustrates a second example of the inter-module balance adjustment circuit. As illustrated in FIG. 6, in the present disclosure, a flyback transformer T1 is configured by a primary-side coil W1, a secondary-side coil W01, and a magnetic coil M1. The primary-side coil W1 and a switch S1 are connected in series with each other, and the secondary-side coil W01 and a switch S01 are connected in series with each other. Similarly, flyback transformers T2 to T14 are configured by primary-side coils W2 to W14, secondary-side coils W02 to W014, and magnetic coils M2 to M14, respectively. The primary-side coils W2 to W14 and switches S2 to S14 are connected in series with each other. The secondary-side coils W02 to W014 and switches S02 to S014 are connected in series with each other.

The series circuit including the primary-side coil W1 and the switch S1 of the flyback transformer T1 is connected to the positive side and the negative side of a battery unit BB1 of a power storage module. The other series circuits including the primary-side coils W2 to W14 and the switches S2 to S14, respectively, are connected to the positive sides and the negative sides of battery units BB2 to BB14, respectively, of power storage modules.

A power storage element 51 is provided, and the power storage element 51 generates a common power supply voltage CV. The common power supply voltage CV is a voltage lower than the total voltage of the series connection of the battery units, namely 716.8 V. The common power supply voltage CV is preferably set to be substantially equal to or lower than one-third of the withstand voltage of the secondary-side switches. For example, the common power supply voltage CV is set to be substantially equal to the unit voltage (51.2 V) of the battery units. The potential of the common power supply voltage CV is controlled in such a way as to be a desired voltage without an overflow or depletion by controlling the total discharge current and the total charge current.

The power storage element 51 is a battery, a capacitor, or the like. The power storage element 51 sets one common power supply line CL+ to the common power supply voltage CV and another common power supply line CL− to 0 V. The other common power supply line CL− is supposed to be a power supply that is different from, and is not connected to, a power supply (V−) of the series connection of the battery units of the plurality of power supply modules. However, the common power supply line CL− may be connected to the power supply V−. One set of ends of the divided primary-side coils W01 to W014 is connected to the common power supply line CL+, and another set of ends of the divided secondary-side coils W01 to W014 is connected to the common power supply line CL− through the switches S01 to S014, respectively.

Figure 7:
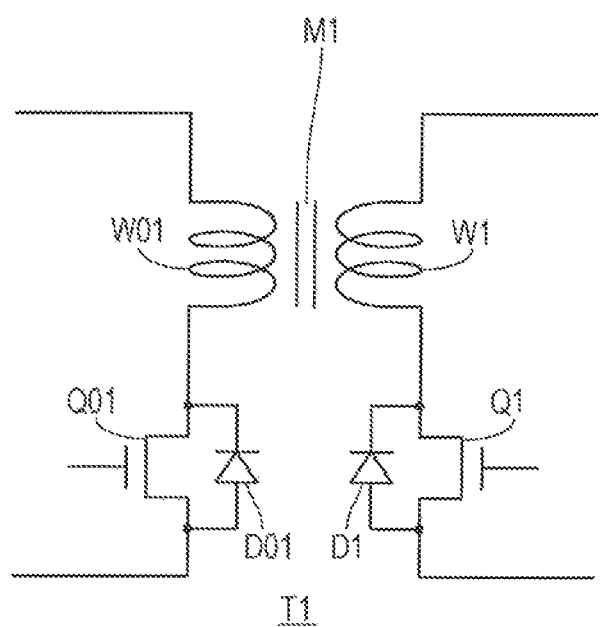
FIG. 7 is a connection diagram illustrating a specific example of switches.

The switches S0 to S14 and the switches S01 to S014 are, for example, configured by MOSFETs. As illustrated in FIG. 7, for example, the switch S01 of the flyback transformer T1 is configured by a MOSFET Q01 and a diode D01 connected between the drain and the source of the MOSFET Q01, and the switch S1 is configured by a MOSFET Q1 and a diode D1 connected between the drain and the source of the MOSFET Q1. The turning on and off of the switches is controlled by control signals from a control unit in the control box ICNT. The control box ICNT receives information regarding results of monitoring of voltage from the module controller CNT of each power storage module and generates a control signal (pulse signal).

Alternatively, a semiconductor switch element such as an IGBT (Insulated Gate Bipolar Transistor) may be used instead of the MOSFET. It is to be noted that, in a switch (configured by a MOSFET and a diode connected between the drain and the source of the MOSFET), current flowing from the source to the drain automatically flows through the diode without a control signal (automatic turning on of the switch).

The common power supply voltage CV is applied to the series circuits of the secondary-side coils W01 to W014 and the switches S01 to S014. For example, by setting the common power supply voltage CV to the same voltage (51.2 V) as the voltage applied to the primary-side coils and the switches, the withstand voltage of the secondary-side switches S01 to S014 can be set to about 154 V. Such a value of withstand voltage is not very high for semiconductor switches that configure the secondary-side switches S01 to S014, and it becomes easier to configure the inter-module balance adjustment circuit.

In each of the flyback transformers T1 to T14, the winding ratio of the primary-side coil to the secondary-side coil is not limited to 1, and the phase on the primary side is opposite to that on the secondary side. Furthermore, the flyback transformers T1 to T14 can transmit power in both directions. Therefore, denotation of the primary side and the secondary side is just for convenience, and both the transmission of power from the primary side to the secondary side and the transmission of power from the secondary side to the primary side are possible.

To take the flyback transformer T1 as an example, when the switch S1 has been turned on after the switches S1 and S01 are off, current flows through the coil W1 and the magnetic core M1 is magnetized. While the switch S1 is on, current that increases over time flows through the coil W1. Next, when the switch S1 has been turned off and the switch S01 has been turned on, current flows to the coil W01 through the switch S01 since the magnetic core has been magnetized. The current becomes current that decreases over time. This holds true for the operation of the other flyback transformers. The flyback transformers have a function of a coupled inductor.

In an active balance adjustment operation using the configuration illustrated in FIG. 6, power is transmitted from a battery unit whose voltage is the highest to the power storage element 51 by controlling the primary-side switches. Furthermore, by controlling the secondary-side switches, power is transmitted to the battery unit of a power storage module whose voltage is the lowest. Thus, the inter-module balance adjustment circuit in the present disclosure transmits power through two bidirectional flyback transformers.

For example, an operation will be described when the voltage of the battery unit BB3 is the highest, namely 56.5 V, and the voltage of the battery unit BB2 is the lowest, namely, 55.9 V. First, the switch S3 of the flyback transformer T3 is turned on, and current flows through the primary-side coil W3 using the battery unit BB3 as a power supply. Next, the switch S3 is turned off, and the switch S03 is turned on. Electromagnetic energy causes current to flow through the secondary-side coil W03 and charges the power storage element 51.

Next, the switch S03 is turned off while the switch S02 of the flyback transformer T2 is turned on, and the power storage element 51 causes current to flow through the secondary-side coil W02. Next, the switch S02 is turned off while the switch S2 is turned on, and current flowing through the primary-side coil W2 charges the battery unit BB2. Thus, the active balance adjustment operation is completed.

Figure 8:
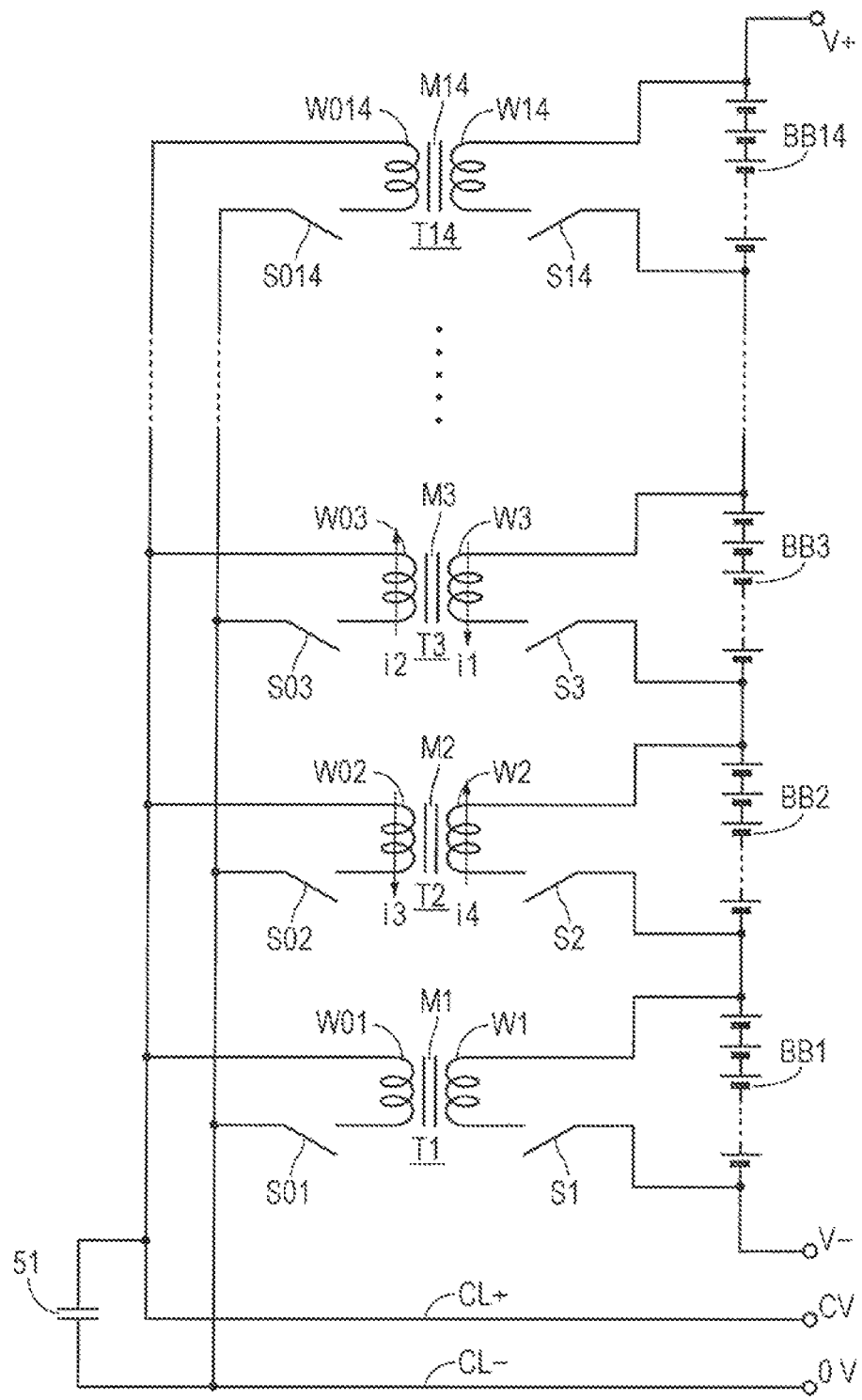
FIG. 8 is a connection diagram illustrating the operation of the second example of the inter-module balance adjustment circuit.

The active balance adjustment operation will be described in a more detailed manner with reference to FIGS. 8 and 9. As illustrated in FIG. 8, current flowing through the coil W3 of the flyback transformer T3 is denoted by i1, and current flowing through the coil W03 is denoted by i2. The currents i1 and i2 have opposite phases. Current flowing through the coil W02 of the flyback transformer T2 is denoted by i3, and current flowing through the coil W2 is denoted by i4. The currents i3 and i4 have opposite phases. Furthermore, assume that the power storage element 51 has been fully charged at the time of the beginning of the operation.

As illustrated by a timing chart of FIG. 9, transmission of power through the flyback transformer T3 and transmission of power through the flyback transformer T2 are performed in parallel with each other. First, as illustrated in FIGS. 9A and 9C, the switches S3 and S02 are turned on for the same period of time. When the switch S3 has been turned on, the current i1 that gradually increases flows through the coil W3 as illustrated in FIG. 9E. When the switch S02 has been turned on, the current i3 that gradually increases flows through the coil W02 as illustrated in FIG. 9G. The current i3 flows through the power storage element 51 in a discharging direction.

Next, the switches S3 and S02 are turned off, and the switches S03 and S2 are turned on for the same period of time as illustrated in FIGS. 9B and 9D. When the switch S03 has been turned on, the current i2 that gradually decreases flows through the coil W03 as illustrated in FIG. 9F. The current i2 flows through the power storage element 51 in a charging direction. By charging the power storage element 51 using the current i2, power is transmitted from the battery unit BB3 to the power storage element 51.

When the switch S2 has been turned on, the current i4 that gradually decreases flows through the coil W2 as illustrated in FIG. 9H. The current i4 flows in a direction in which the battery unit BB2 is charged. The charging using the current i4 causes power in the power storage element 51 to be transmitted to the battery unit BB2. It is to be noted that, in actual transmission of power, power is transmitted little by little not by a single switching operation but by a plurality of switching operations. Furthermore, the amounts of power to be transmitted can be set to desired values by modulating the pulse widths of the pulse signals for the switches and by controlling the on periods of the switches. In addition, although the switches S3 and S02 are synchronized with each other in FIG. 9, the synchronizing relationship need not be established in practice if the common power supply voltage CV allows a certain width.

Furthermore, a modification of the inter-module balance adjustment circuit that can be applied to the present disclosure will be described. In the above-described inter-module balance adjustment circuit, power obtained through a single flyback transformer is transmitted through a single flyback transformer. However, power may be obtained through a plurality of flyback transformers. For example, power may be obtained through a power storage module whose voltage is the highest and a power storage module whose voltage is the second highest. Furthermore, the obtained power may be transmitted through a plurality of flyback transformers. For example, power may be supplied to a power storage module whose voltage is the lowest and a power storage module whose voltage is the second lowest. For example, in the above-described configuration illustrated in FIG. 6, power is obtained through the flyback transformer T14 using small current, and, at the same time, power is obtained through the flyback transformer T3 using large current. Furthermore, at the same time as the obtainment of the power, power is supplied through the flyback transformers T1 and T2 using moderate current.

Figure 10:
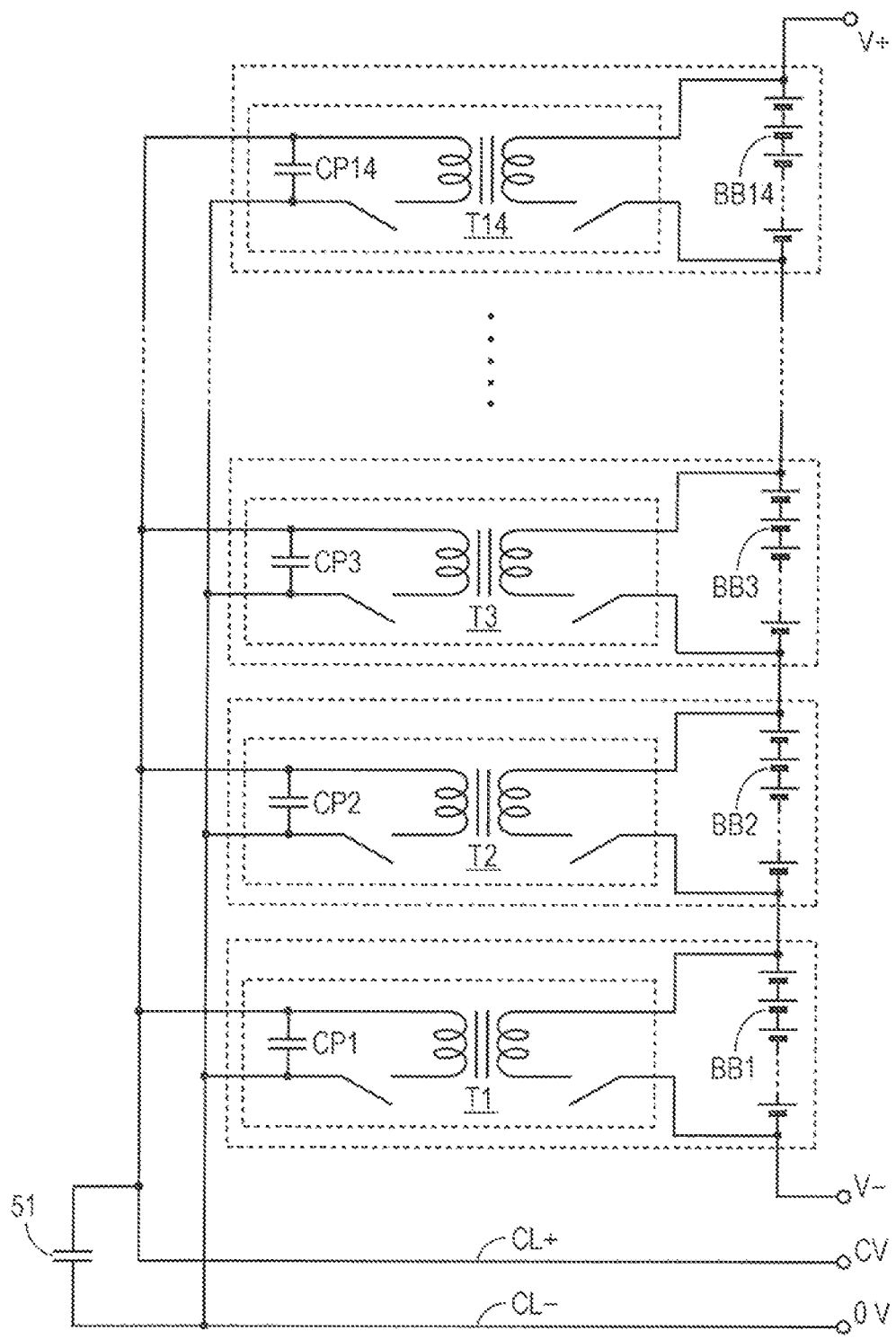
FIG. 10 is a connection diagram illustrating a third example of the inter-module balance adjustment circuit.

As illustrated in FIG. 10, on the secondary side of the flyback transformers T1 to T14 of the power storage modules, capacitors CP1 to CP14, respectively, are inserted between the common power supply line CL+ and the common power supply line CL−. By decreasing high-frequency components using the capacitors CP1 to CP14, voltage generated in the common power supply lines CL+ and CL− can be output as a direct-current power supply. The direct-current power supply may be supplied as the power supply of the control box ICNT.

Figure 11:
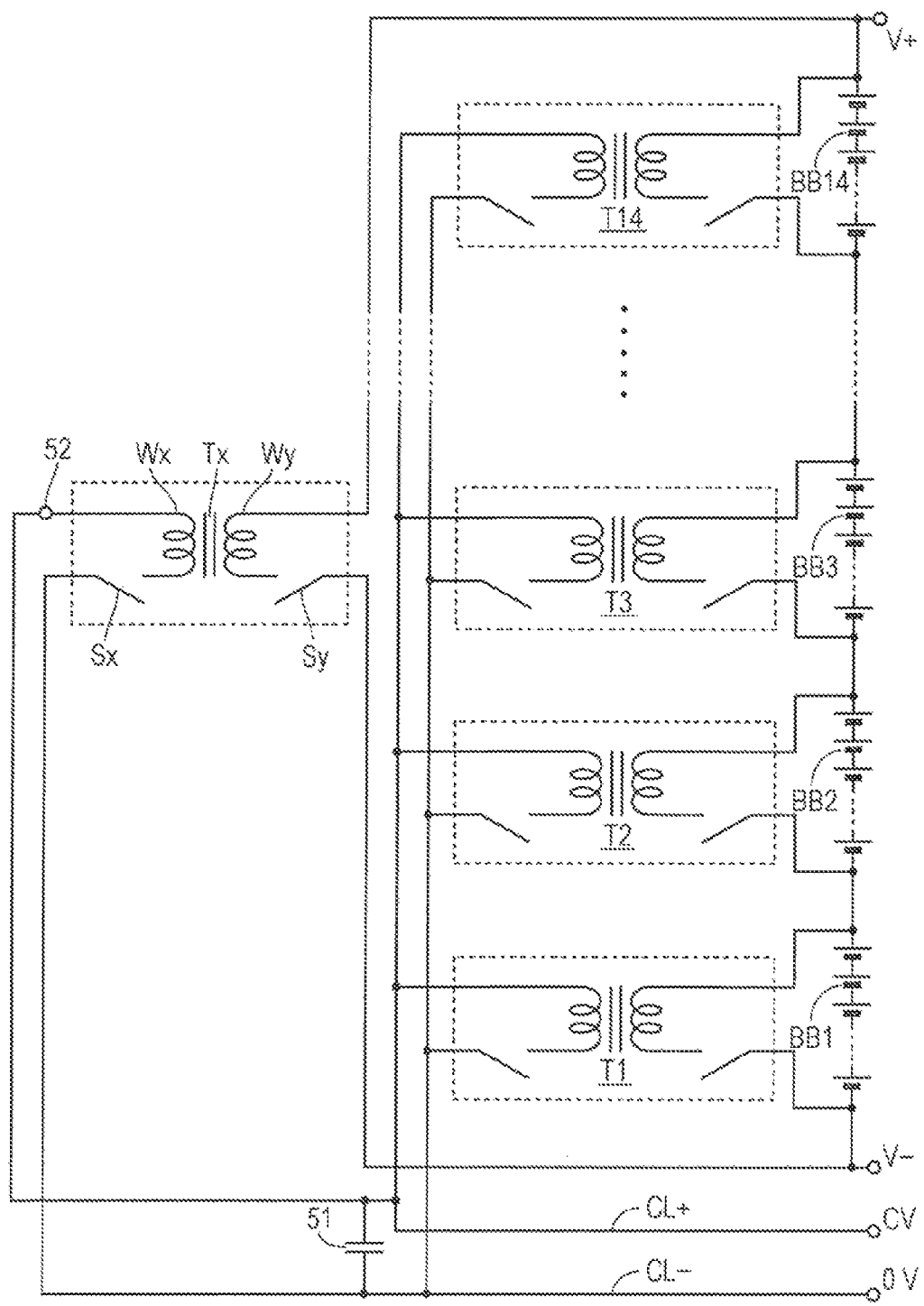
FIG. 11 is a connection diagram illustrating a fourth example of the inter-module balance adjustment circuit.

Furthermore, as illustrated in FIG. 11, a flyback transformer Tx may be provided for all the power storage modules in common. The flyback transformer Tx is configured by a primary-side coil Wy, a secondary-side coil Wx, and a magnetic core. The coil Wx and a switch Sx are connected in series with each other. The coil Wy and a switch Sy are connected in series with each other. One end of the secondary-side coil Wx of the flyback transformer Tx is connected to a terminal 52, and another end is connected to a line of 0 V through the switch Sx. The terminal 52 is connected to a common power supply voltage CV terminal.

One end of the primary-side coil Wy is connected, for example, to the positive side (V+) of the series connection of the battery units BB1 to BB14 of a plurality of, namely, for example, fourteen, power storage modules. Another end of the primary-side coil Wy is connected to the negative side (V−) of the series connection of the battery units BB1 to BB14. As with the configuration illustrated in FIG. 6, the flyback transformers T1 to T14 and the power storage element 51 are connected to the battery units BB1 to BB14, and the above-described inter-module balance control is performed.

According to the configuration illustrated in FIG. 11, power can be supplied to the battery units of all the power storage modules at once through the flyback transformer Tx, and therefore it is possible to increase the number of variations of the operation of the inter-module balance control.

Furthermore, in the present disclosure, a forward converter adopting a method other than a flyback converter method and a power transmission apparatus adopting an electromagnetic coupling method such as an RCC (Ringing Choke Converter) method may be used.

Figure 12:
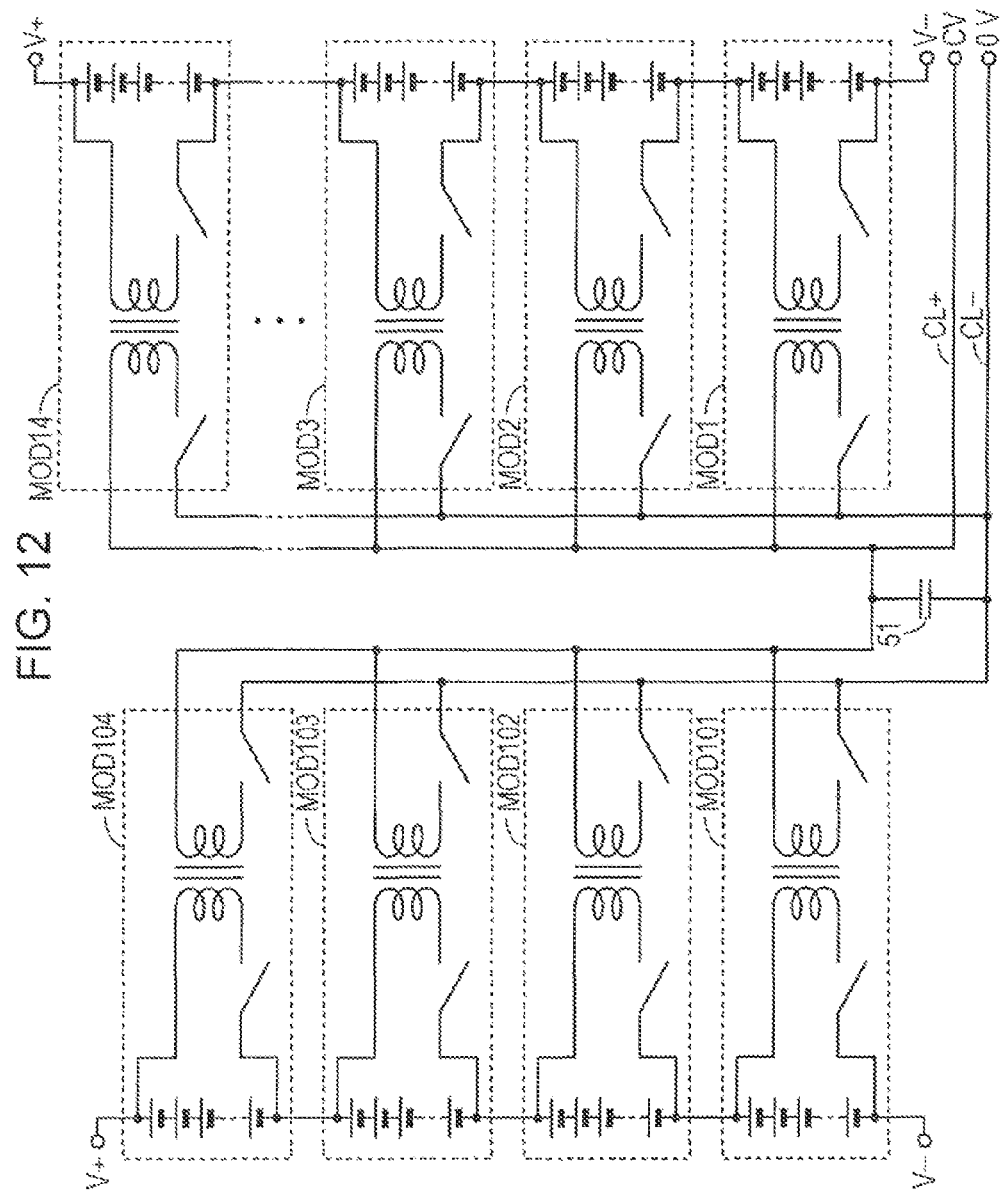
FIG. 12 is a connection diagram illustrating a fifth example of the inter-module balance adjustment circuit.

FIG. 12 illustrates an application example of the present disclosure, in which another power reserve apparatus configured by power storage modules MOD101 to MOD104 is connected to power storage modules MOD1 to MOD14 (the configuration illustrated in FIG. 6). The common power supply lines CL+ and CL− can be connected to the other power reserve apparatus insofar as the common power supply voltage CV is the same between the two power reserve apparatuses. That is, it is easier to increase the number of power storage modules connected.

"Benefits of Inter-Module Balance Adjustment Circuit"

In the inter-module balance adjustment circuits having the configurations illustrated in FIGS. 5, 6, 10, 11, and 12, since the flyback transformer of each module is configured separately, star-shaped wiring need not be provided unlike the configuration in which a magnetic core is used in common, and therefore wiring can be simple.

Furthermore, in these inter-module balance adjustment circuits, the voltage of both ends of the battery unit of each power storage module is applied to the primary-side coil and the switch of each flyback transformer, and the common power supply voltage CV is applied to the secondary-side coil and the switch. The common power supply voltage CV is, for example, configured to have the same value as the voltage of both ends of the battery unit of each power storage module. Therefore, the voltage of the series connection of all the power storage modules is not applied to the coils and the switches, and therefore coils and switches having low withstand voltages can be used, which is advantageous.

Furthermore, in these inter-module balance adjustment circuits, the primary-side switches S1 to S14 and the secondary-side switches S01 to S014 of the flyback transformers can be controlled using independent control pulse signals. Therefore, power can be transmitted through a plurality of desired flyback transformers. Furthermore, by setting the lengths of the on periods of the switching operations, the amounts of power to be transmitted through the flyback transformers can be individually controlled. That is, by prolonging the period for which a switch is turned on in accordance with the amount of power to be transmitted, the amount of power to be transmitted can be changed.

Furthermore, since large current flows between output terminals V+ and V− of the plurality of power storage modules, relatively large noise tends to be generated. However, since the common power supply voltage CV is insulated from the output terminals V+ and V−, effects of noise caused by variation in load current can be reduced.

The common power supply voltage CV, which is hardly affected by noise, can be used as the power supply of the control box ICNT. For example, the value of the common power supply voltage CV may be the same (+5 V, +12 V, or the like) as the value of the power supply voltage of the control unit. When the common power supply voltage CV is used as the power supply of the control box ICNT, the power supply of the control box ICNT can be configured in such a way as not to be affected by variation in the voltages of the power storage modules "Example of Power Reserve System"

Figure 13:
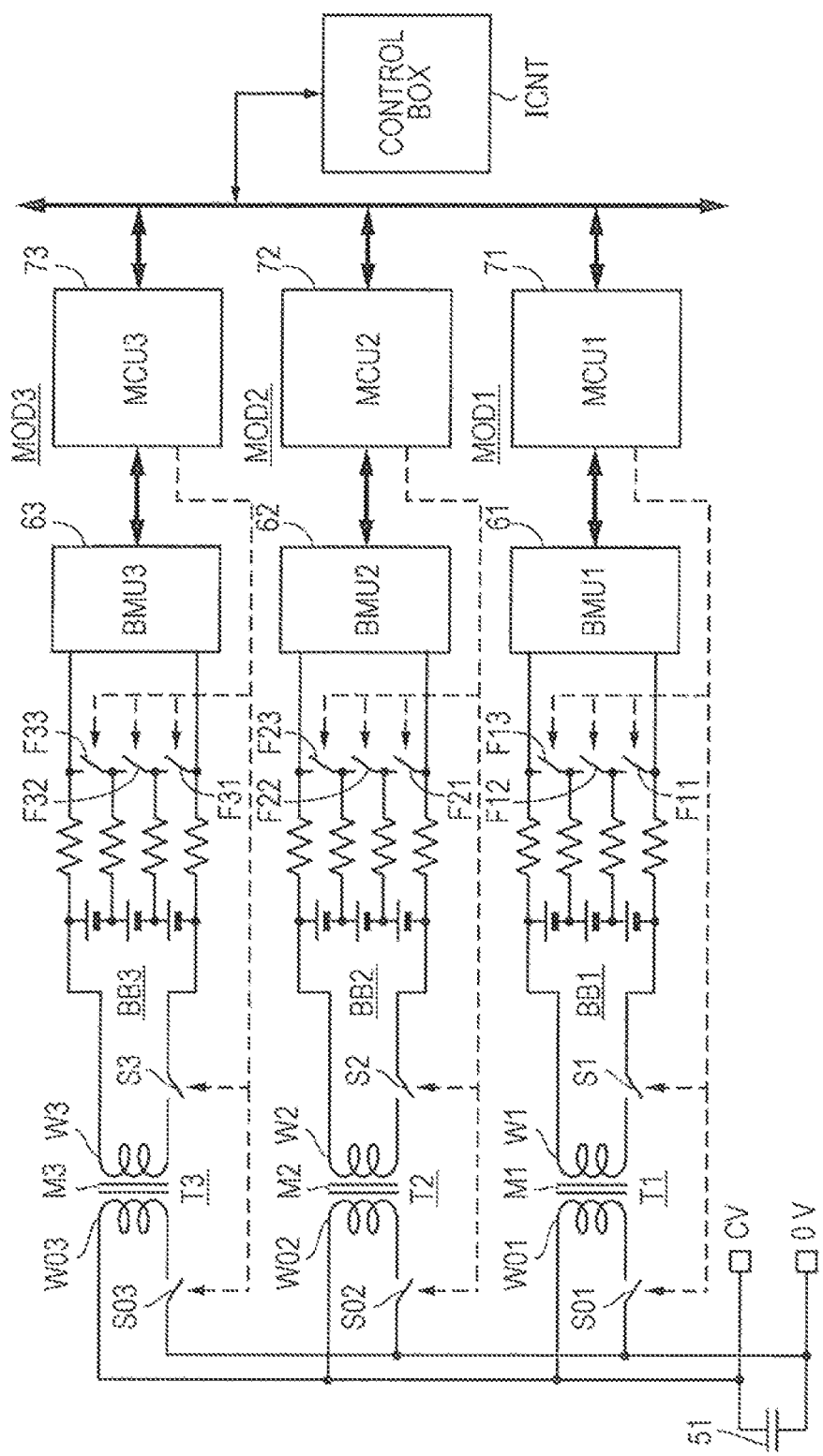
FIG. 13 is a block diagram of an example of a power reserve apparatus including a balance adjustment circuit in the present disclosure.

FIG. 13 illustrates a configuration in which the present disclosure is applied to a power reserve system including n, namely, for example, three, power storage modules MOD1 to MOD3. The power storage modules include battery units BB1, BB2, and BB3, the above-described inter-cell balance adjustment units and inter-module balance adjustment units, battery monitoring units 61, 62, and 63 (represented as BMU1, BMU2, and BMU3 in the figure), and control units 71, 72, and 73 (represented as MCU1, MCU2, and MCU3 in the figure), respectively. In addition, the battery monitoring units 61, 62, and 63 and the control units 71, 72, and 73 are connected to each other by communication paths that enable interactive communication.

The inter-cell balance adjustment units, the inter-module balance adjustment units, the battery monitoring units 61, 62, and 63, and the control units 71, 72, and 73 configure the module controller CNT illustrated in FIG. 1. The control units 71, 72, and 73 of the modules and the control box ICNT that controls the entirety of the system are connected with each other through communication paths that enable interactive communication. As a communication method, for example, CAN is used. In these years, the CAN is used as an on-vehicle LAN. It is to be noted that FIG. 13 illustrates the configuration for controlling the inter-cell balance adjustment and the inter-module balance adjustment, and therefore connections relating to transmission of power are omitted.

The inter-cell balance adjustment units equalize the voltages of the battery blocks (or the battery cells) of the battery units of the power storage modules using the passive balance adjustment method. Since a battery block whose voltage is high is caused to discharge in the passive balance adjustment method, switches and resistors are connected parallel to the battery blocks. The switches are, for example, configured by MOSFETs (Metal Oxide Semiconductor Field Effect Transistors). Switches F11, F12, and F13 are connected to the power storage module MOD1, switches F21, F22, and F23 are connected to the power storage module MOD2, and switches F31, F32, and F33 are connected to the power storage module MOD3.

For the inter-module balance adjustment units, any of the above-described configurations of the inter-module balance adjustment circuit may be used. In the configuration illustrated in FIG. 13, for example, the configuration illustrated in FIG. 6 is used. That is, flyback transformers T1, T2, and T3 are provided, battery units and switches S1, S2, and S3 are connected to the primary side of the flyback transformers, and switches S01, S02, and S03 and a power storage element 51 are connected to the secondary side of the flyback transformers.

Control signals for controlling the switches included in the balance adjustment units are output from the control units 71, 72, and 73. The control signals for controlling the switches included in the inter-cell balance adjustment units of the power storage modules are output from the control units of the power storage modules. For example, in the power storage module MOD1, the voltage of each battery block of the battery unit BB1 is detected by the battery monitoring unit 61 and transmitted to the control unit 71. The control unit 71 detects a battery block whose voltage is the highest among the voltages of the battery blocks and turns on the switch connected to the battery block, so that the battery block discharges. The same inter-cell balance adjustment operation is performed in the other power storage modules MOD2 and MOD3. Since the amounts of discharge correspond to the periods for which the switches are turned on, the pulse widths of the control signals for controlling the switches have been modulated in accordance with the amounts of discharge.

Control information for the inter-module balance adjustment is generated by the control box ICNT, and transmitted to the control unit of each power storage module. That is, the voltages of all the battery blocks of all the power storage modules MOD1, MOD2, and MOD3 and the voltages of the battery units are transmitted to the control box ICNT through the battery monitoring units 61, 62, and 63, the control units 71, 72, and 73, and the communication paths. The control box ICNT generates the control information for the inter-module balance adjustment from the received voltage information and transmits the control information to the power storage modules. Since the amounts of energy to be transmitted between the power storage modules correspond to the periods for which the switches are turned on, the pulse widths of the control signals for controlling the switches have been modulated in accordance with the amounts of energy.

In parallel with the inter-cell balance adjustment operation and the inter-module balance adjustment operation, the control box ICNT measures the voltage between the power supply lines CL+ and CL− to which the common power supply voltage CV is supplied, and controls the entirety of the inter-module balance adjustment such that the common power supply voltage CV becomes a desired voltage.

Alternatively, the control information for the inter-cell balance adjustment may be generated by the control units 71, 72, and 73 and may be supplied to the switches FF11 to FF33 through the battery monitoring units 61, 62, and 63. Furthermore, the control information for the inter-cell balance adjustment may be generated by the control box ICNT and may be transmitted to the control units of the power storage modules by communication "Example of Module Controller"

An example of the configuration of the module controller, that is, for example, the battery monitoring unit 61 and the control unit 71 of the power storage module MOD1, will be described with reference to FIG. 14. The battery unit BB1 is, for example, configured by the series connection of three battery cells C1, C2, and C3. Switches F11, F12, and F13 configured by FETs and resistors are connected parallel to the battery cells. The switches F11, F12, and F13 are turned on or off by the control signals from the control unit 71 whose pulse widths have been modulated. As a result, the inter-cell balance adjustment is completed by the passive balance adjustment.

The battery monitoring unit 61 includes a multiplexer 55. The voltages of the battery cells C1, C2, and C3 and the voltage of both ends of the battery unit BB1 are input to the multiplexer 55. The multiplexer 55 sequentially selects these voltages and supplies the voltages to an A/D converter 65. The A/D converter 65 converts the individual values of voltage into digital signals. For example, analog voltage data is converted into digital voltage data of 14 to 18 bits.

A resistor 57 that detects current flowing through the battery unit BB1 is connected in series with the battery unit BB1. The voltage of both ends of the resistor 57 is supplied to an A/D converter 67 through an amplifier 56. The A/D converter 67 converts the values of current into digital signals. Furthermore, a temperature measurement unit 58 that detects the temperature of each cell is provided. Temperature information from the temperature measurement unit 58 is supplied to an A/D converter 66. The A/D converter 66 converts the temperature information into a digital signal. It is to be noted that, as methods used by the A/D converters 65, 66, and 67, various methods such as a successive-approximation method and a $\Delta\Sigma$ (delta-sigma) method can used. Furthermore, A/D converters need not necessarily be provided separately for voltage, current, and temperature.

The outputs of the A/D converters 65, 66, and 67 are supplied to a communication unit 68. The communication unit 68 communicates with the control unit 71. Furthermore, the control unit 71 is connected through a communication path to the control box ICNT that controls the entirety of the system. In FIG. 14, the configuration relating to the inter-module balance adjustment is omitted. The control unit 71 generates control signals for controlling the switches of the inter-module balance adjustment units.

Figure 14:
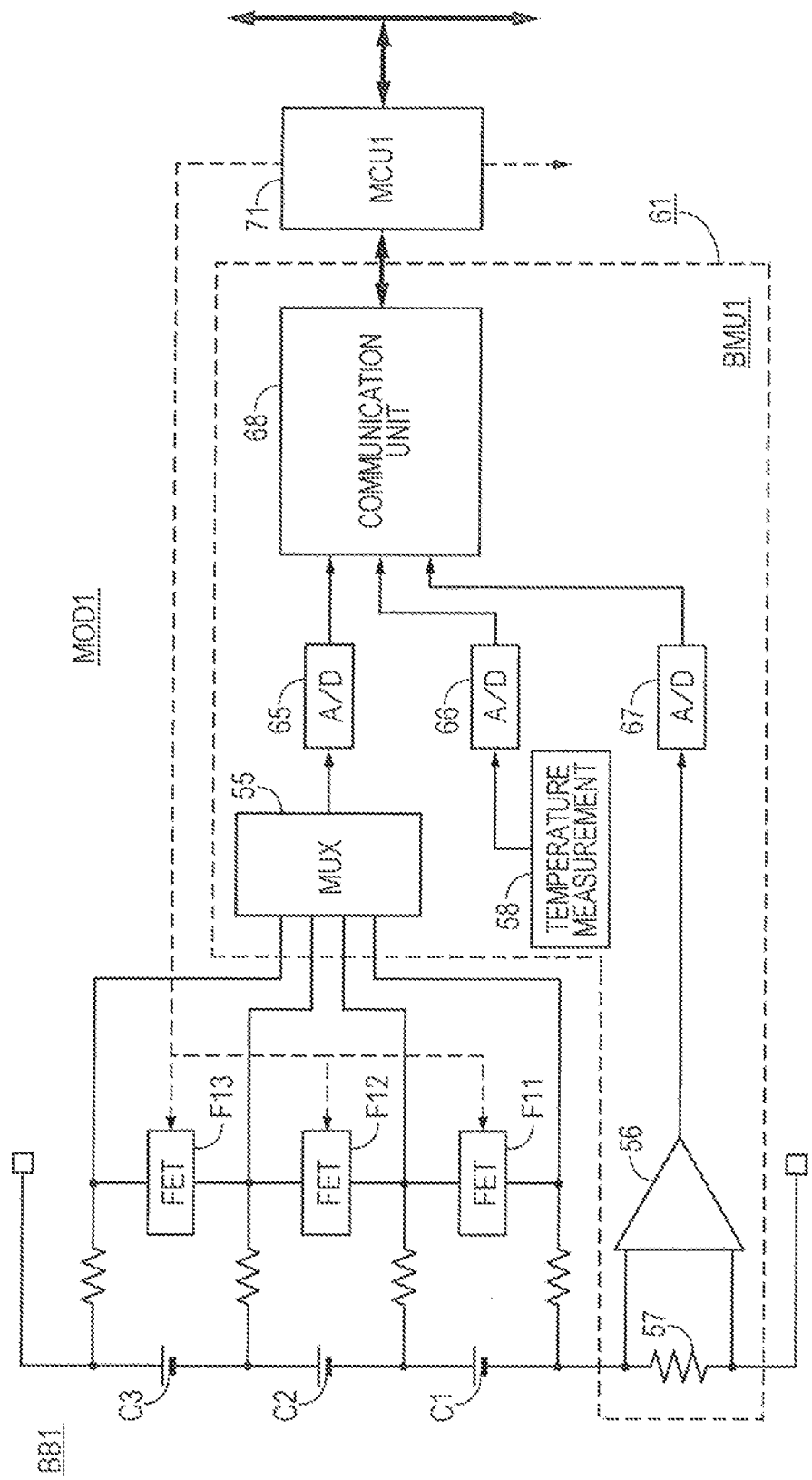
FIG. 14 is a block diagram of an example of a control unit provided for each power storage module in the present disclosure.

In the module controller CNT illustrated in FIG. 14, the A/D converters 65, 66, and 67, the communication unit 68, and the control unit 71 are low voltage power supply units that can operate using low voltage, namely, for example, a power supply of 5 V. The power supply of the low voltage power supply units is configured to be supplied from the control box ICNT. When the power supply is supplied from the battery unit BB1, the balance between the power storage modules can be lost due to differences in power consumption between the module controllers. Therefore, the power supply of the low voltage power supply units in the module controller is configured to be supplied from the control box ICNT.

Although the module controller of the power storage module MOD1 has been described above, module controllers of the other power storage modules MOD2 and MOD3 have the same configuration as the module controller of the power storage module MOD1.

"First Example of Balance Adjustment in Present Disclosure"

Figure 15:
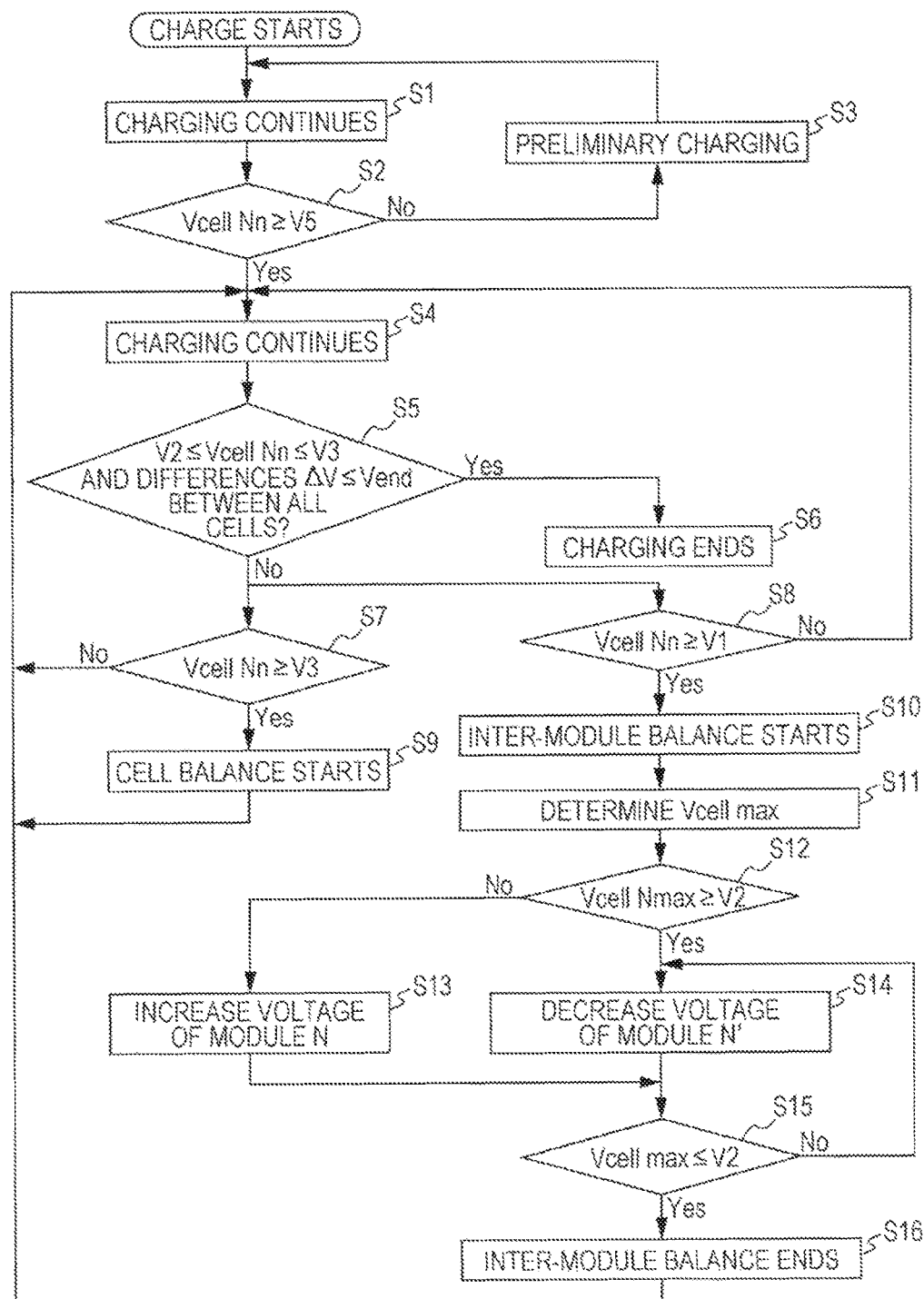
FIG. 15 is a flowchart illustrating a first example of a balance adjustment process in the present disclosure.
Figure 16:
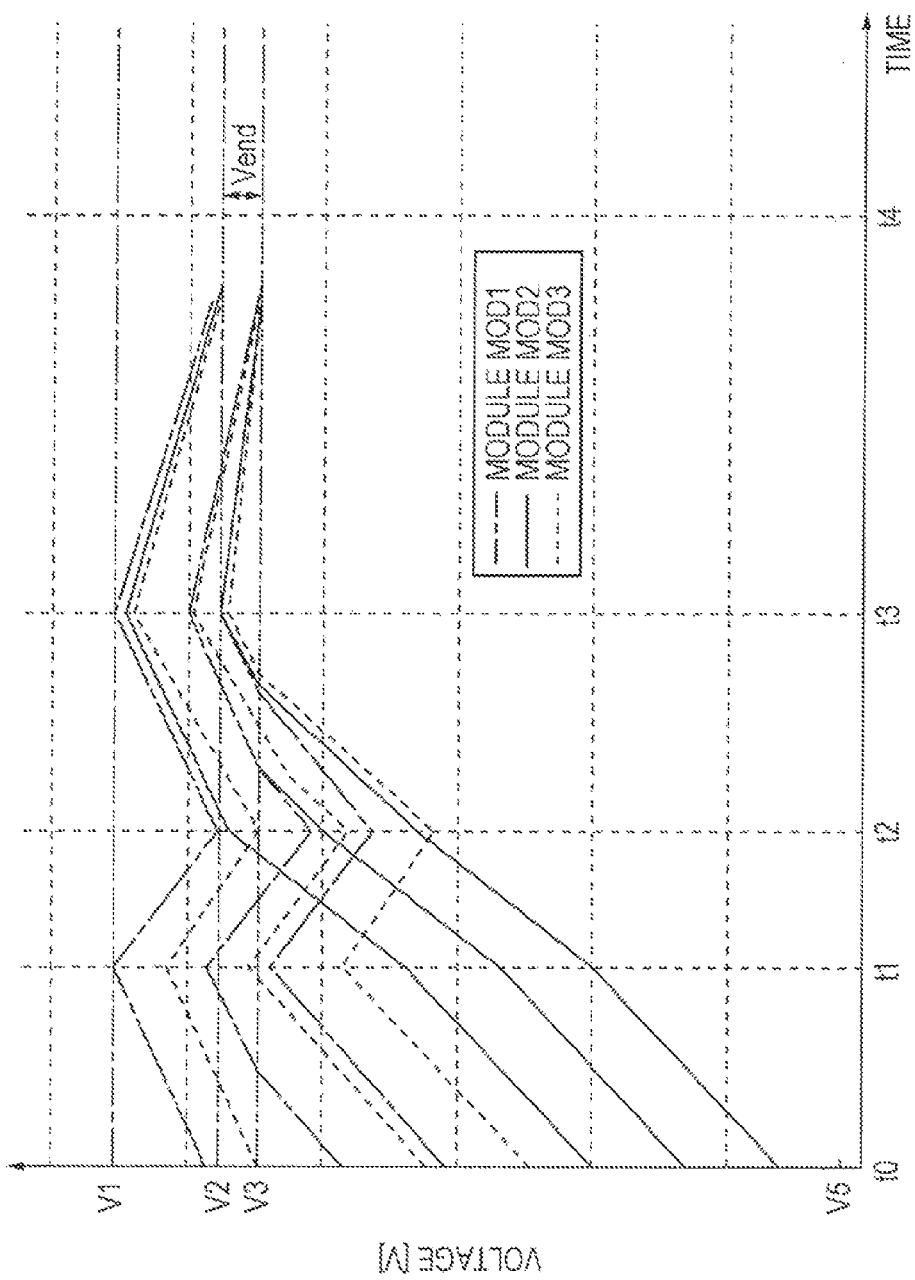
FIG. 16 is a schematic diagram illustrating changes in the voltages of battery cells in the first example of the balance adjustment process in the present disclosure.

FIG. 15 illustrates the flow of the control operation of balance adjustment according to an embodiment of the present disclosure during charging. Furthermore, FIG. 16 illustrates changes in the voltages of battery cells included in power storage modules during charging. As illustrated in FIG. 13, the illustrated changes in voltage are changes in the voltages of battery cells in the case of a power reserve system including three power storage modules MOD1, MOD2, and MOD3, each including three battery cells.

In FIG. 16, changes in voltage indicated by dash-dot lines represent changes in the voltages (hereinafter referred to as the cell voltages as necessary) of the three battery cells in the power storage module MOD1, changes in voltage indicated by solid lines represent changes in the cell voltages of the three battery cells in the power storage module MOD2, and changes in voltage indicated by broken lines represent changes in the cell voltages of the three battery cells in the power storage module MOD3. By the control in the present disclosure, all the cell voltages eventually become substantially the same, and the voltages between the power storage modules become substantially the same. For example, differences $\Delta V$ in voltage between the battery cells fall within a control completion voltage width indicated by Vend in FIG. 16. For example, Vend=30 mV.

As illustrated in FIG. 16, the period from time t0, at which charging begins, to when the differences $\Delta V$ in voltage between the battery cells in the battery units have fallen within the voltage width Vend is divided in accordance with processes, as will be described later. The processes switch in accordance with the relationship between first, second, third, and fourth threshold values (voltages) V1, V2, V3, V4, and V5 (V1>V2>V3>V4>V5) and the cell voltages. The threshold value V1 corresponds to an upper limit value of the cell voltages during charging. The threshold values V2 and V3 are an upper limit value and a lower limit value, respectively, of the voltage width Vend. The threshold vale V5 is used to judge whether or not to perform preliminary charging. The threshold value V4 relates to a second example of the balance adjustment, which will be described later.

In the example illustrated in FIG. 16, the processes switch in accordance with the threshold values V1 to V5 as described below. It is to be noted that charging already begins at the time t0.

Time t0 to t1: Inter-cell balance adjustment (passive balance adjustment) period Time t1 to t2: Inter-module balance adjustment (active balance adjustment) period Time t2 to t3: Inter-cell balance adjustment (passive balance adjustment) period Time t3 to t4: Inter-cell balance adjustment and inter-module balance adjustment period Furthermore, the flow of the processes will be described with reference to a flowchart of FIG. 15. The definitions of signs illustrated in the flowchart of FIG. 15 are as follows:

Vcell Nn: The n-th cell voltage of the N-th power storage module (in the example illustrated in FIG. 16, N=1 to 3 and n=1 to 3)

Vcell Nmax: The maximum cell voltage in the N-th power storage module

Vcell max: The maximum cell voltage in all the battery cells

Vend: The balance control completion voltage width

Charging continues (step S1) after the beginning of the charging, and, in step S2, whether or not the individual cell voltages Vcell Nn of all the battery cells are higher than the threshold value V5 is judged. The control box ICNT monitors each of the cell voltages of the nine battery cells and each of the voltages of the three power storage modules.

If the cell voltages Vcell Nn are equal to or lower than V5, preliminary charging is performed in step S3 using, for example, a current of 0.1 C. If it is judged that the cell voltages Vcell Nn are higher than V5, the charging continues (step S4), and a judgment process in step S5 is performed.

If the battery cells are lithium-ion secondary batteries, constant-current/constant-voltage charging is performed. For example, charging is performed using a charging current of 0.5 C, and, as illustrated in FIG. 16, the cell voltages increase because of the charging that began at the time t0.

In step S5, using the threshold values V2 and V3, whether or not a condition (V2≤cell voltages Vcell Nn≤V3) is satisfied and whether or not the differences (variations) $\Delta V$ between all the cell voltages satisfy ($\Delta V \leq$Vend) are judged. That is, whether or not all the cell voltages exist within the voltage width between the threshold value V2 (upper limit value) and the threshold value V3 (lower limit value) is judged. If results of the judgment are positive, the operation of charging control (also the operation of balance control) ends (step S6). It is to be noted that, as with the normal charging control, the charging may be terminated by detecting full charge.

If the results of the judgment in step S5 are negative, processes in step S7 and step S8 are performed. Step S7 is a process for judging whether or not any of the cell voltages Vcell Nn has exceeded the threshold value V3. Step S8 is a process for judging whether or not any of the cell voltages Vcell Nn has exceeded the threshold value V1. Step S7 is a process for judging whether or not to perform the inter-cell balance adjustment, and step S8 is a process for judging whether or not to perform the inter-module balance adjustment.

If a result of the judgment in step S7 is positive, that is, if the voltage of the battery cell has exceeded the threshold value V3, the battery cell discharges and the inter-cell balance adjustment operation begins (step S9). If the result of the judgment in step S7 is negative, the control returns to step S4, and the same control as that described above is repeated. When the inter-cell balance adjustment has begun in step S9, too, the control returns to step S4, and the same control as that described above is repeated. If the result of the judgment in step S8 is negative, too, the control returns to step S4, and the same control as that described above is repeated.

In the example illustrated in FIG. 16, at the timing t0, the maximum cell voltage of the power storage module MOD1 (having the changes in voltage indicated by the dash-dot lines) is equal to or higher than the threshold value V3. Therefore, at the timing t0, the battery cell whose voltage is the highest among the three battery cells in the power storage module MOD1 has already begun to discharge. However, since the charging operation is continuing and the charge current is larger than the discharge current during the inter-cell balance adjustment, the voltage of a battery cell that discharges during the inter-cell balance adjustment increases. The voltage of the battery cell during the discharging increases more gradually than the voltages of the other battery cells in the same module. Furthermore, because another battery cell whose voltage is the second highest in the power storage module MOD1 reaches the threshold value V3 at a time later than the timing t0, this battery cell also begins to discharge and therefore the inclination of an increase in voltage becomes more gradual after a certain moment. Thus, in the inter-cell balance adjustment, a cell discharge FET is turned on to intentionally delay the discharging, thereby keeping the balance of voltage with the other power storage modules.

In the case of the power storage module MOD3 (having the changes in voltage indicated by the broken lines), too, a battery cell whose cell voltage has reached the threshold value V3 discharges at the timing t0. In the case of the power storage module MOD2 (having the changes in voltage indicated by the solid lines), because the cell voltages of all the battery cells do not reach the threshold value V3 between the timing t0 and the timing t1, the inter-cell balance adjustment operation (discharging by the cells) is not performed.

If the result of the judgment in step S8 is positive, that is, if the cell voltage of any of the battery cells exceeds the threshold value V1, the control proceeds to step S10, and the inter-module balance adjustment begins. In the example illustrated in FIG. 16, the maximum cell voltage of the power storage module MOD1 becomes equal to or higher than the threshold value V1 at the timing t1, and the inter-module balance adjustment begins at the timing t1.

In step S11, Vcell max (the maximum cell voltage among all the battery cells) is determined. Next, in step S12, Vcell Nmax and the threshold value V2 are compared. That is, in step S12, the judgment of (Vcell Nmax≥V2) is made. If a result of this judgment is negative, the control proceeds to step S13. In step S13, the voltage of the power storage module (N) judged in step S12 is increased. The process then proceeds to step S15.

In the example illustrated in FIG. 16, because Vcell Nmax of the power storage module MOD2 (the changes in voltage indicated by the solid lines) does not reach the threshold value V2 before the timing t2, the voltage of the power storage module MOD2 is increased by the inter-module balance adjustment (step S13). Since power is supplied from the other power storage modules in the inter-module balance adjustment, an increase in the changes of the voltage of the power storage module MOD2 is sharper than an increase during charging.

On the other hand, since Vcell Nmax of each of the power storage modules MOD1 and MOD3 is equal to or higher than the threshold value V2, power is discharged and the cell voltages of these power storage modules decrease in step S14. In step S15, whether or not the maximum cell voltage Vcell max among all the battery cells is lower than the threshold value V2. At the timing t2 illustrated in FIG. 16, Vcell max is smaller than the threshold value V2. Therefore, the control proceeds to step S16, and the inter-module balance adjustment ends.

In the inter-module balance adjustment, the control box ICNT generates control signals whose pulse widths have been modulated and supplies the control signals to the control units 71 to 73 of the module controllers of the power storage modules. The control units 71 to 73 control the switches for the inter-module balance adjustment in accordance with the control signals. When the voltages of the power storage modules are to be decreased, the primary side of the flyback transformers discharges, and the secondary side of the flyback transformers enters the charging state. When the voltages of the power storage modules are to be increased, the secondary side of the flyback transformers discharges, and the primary side of the flyback transformers enters the charging state.

After step S16, the control returns to step S4. At the timing t2, because the differences in voltage between the battery cells do not fall within the voltage width Vend, the results of the judgment in step S5 are negative, and the control proceeds to step S7 and step S8. At the time t2, because (Vcell Nn≥V1) is not satisfied, the inter-cell balance adjustment is performed on a power storage module for which the result of the judgment in step S7 is positive.

When the cell voltage has exceeded the threshold value V3 between the timing t2 and the timing t3, the battery cell discharges during the inter-cell balance adjustment, and, as a result, the inclination of an increase in the cell voltage becomes more gradual. Even if the inter-cell balance adjustment is performed, since the charge current larger than the discharge current is flowing, the inclination of a change in the cell voltage is positive.

Next, at the timing t3, the cell voltages of all the power storage modules fall within the voltage width defined by the threshold values V1 and V3. Therefore, the result of the judgment in step S7 becomes positive, and accordingly the inter-cell balance adjustment is performed and the cell voltages are controlled in such a way as to become close to the threshold value V3. Furthermore, because the maximum cell voltage of the power storage module MOD1 reaches the threshold value V1, the result of the judgment in step S8 becomes positive. By the control of the above-described inter-module balance adjustment in step S10 to step S16, the voltages of the power storage modules are controlled in such a way as to become close to the threshold value V2.

When the results of the judgment in step S5 have become positive by such control, the cell voltages of all the battery cells fall within the desired voltage width Vend, and since all the batteries are within the range of V2 to V3, the charging operation (balance control operation) ends.

"Second Example of Balance Adjustment in Present Disclosure"

Figure 17:
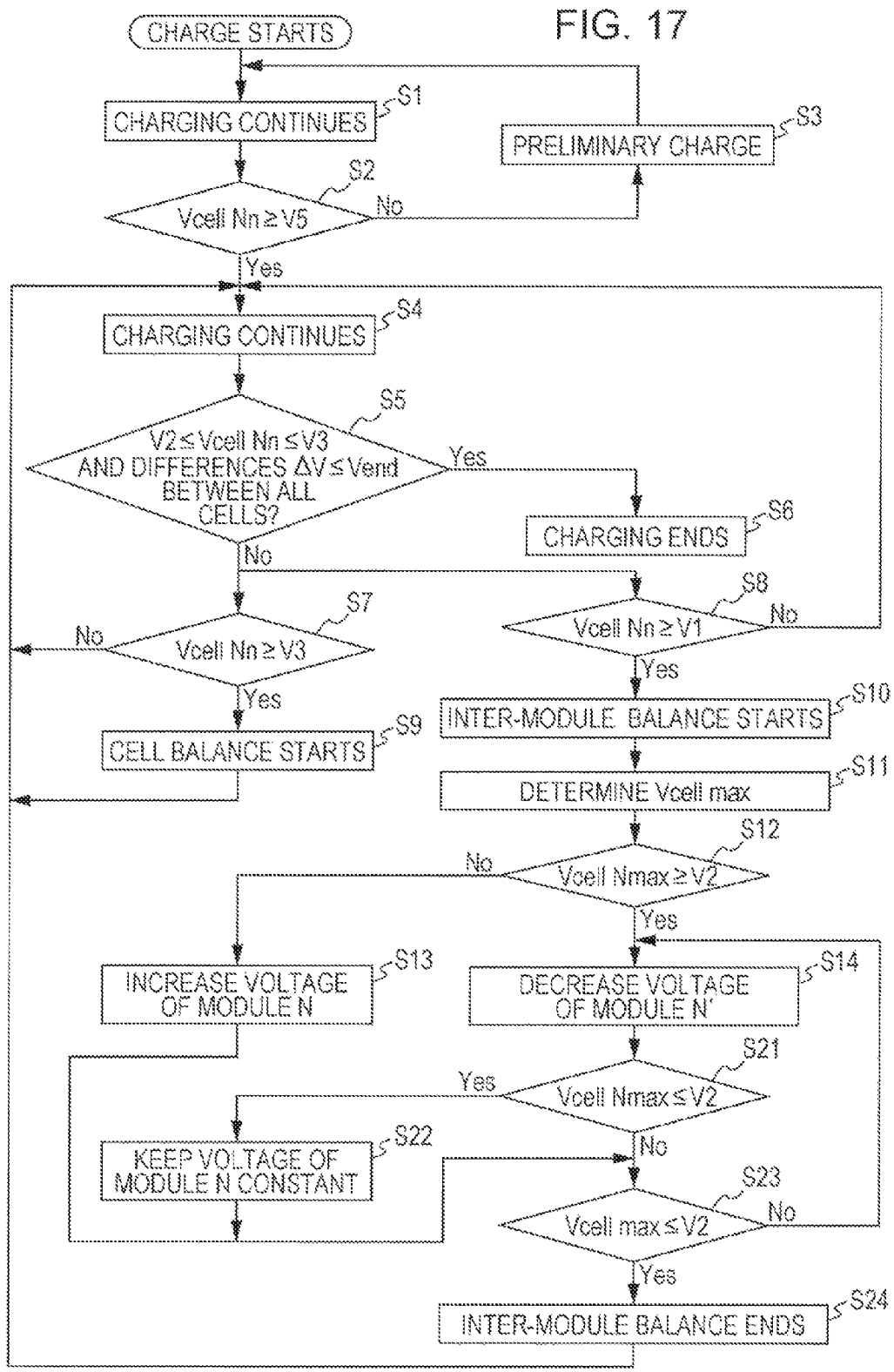
FIG. 17 is a flowchart illustrating a second example of the balance adjustment process in the present disclosure.
Figure 18:
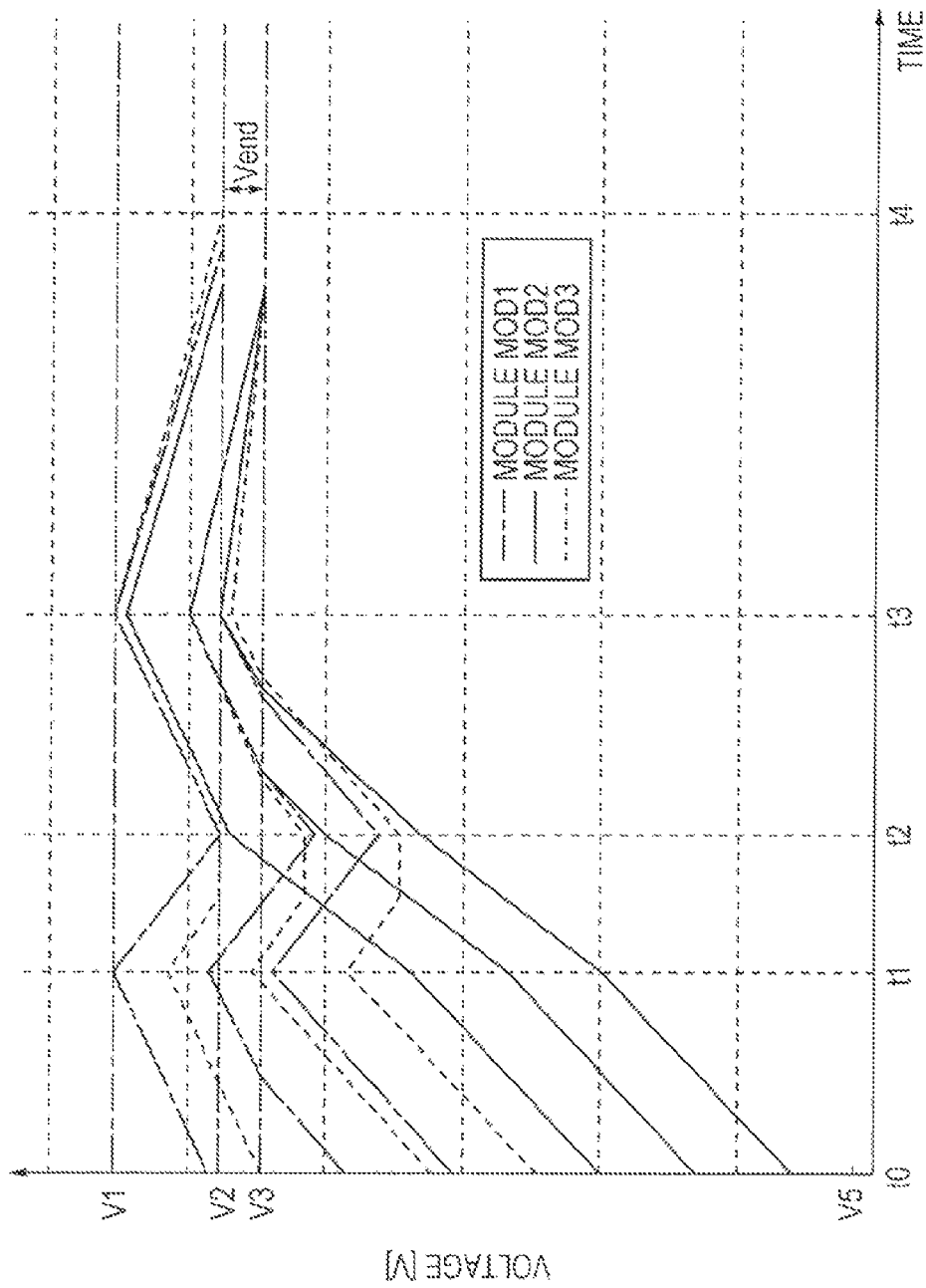
FIG. 18 is a schematic diagram illustrating changes in the voltages of battery cells in the second example of the balance adjustment process in the present disclosure and changes in the voltages of battery cells in an example of a passive balance adjustment process.

A second example of the balance adjustment will be described using a flowchart of FIG. 17 and a graph of FIG. 18 illustrating changes in voltage. In the second example, as illustrated by broken lines in FIG. 18, if it is detected in step S21 that the maximum cell voltage Vcell Nmax in the third power storage module has decreased to the threshold value V2 when the voltages of the battery cells decrease in the period (t1 to t2) of the inter-module balance adjustment, the voltage of the power storage module is kept constant in step S22. At this time, the threshold value V4, which is smaller than the threshold value V1, may be set separately from the threshold value V2, and the voltage of the power storage module may be kept constant upon reaching the threshold value V4.

Next, in step S23, whether or not the maximum cell voltage Vcell max among all the battery cells is lower than the threshold value V2 is judged. If it is judged that the maximum cell voltage Vcell max is lower than the threshold value V2, the inter-module balance adjustment ends (step S24). By such control, variation in voltage between the battery cells at the timing t2 can be reduced.

Figure 19:
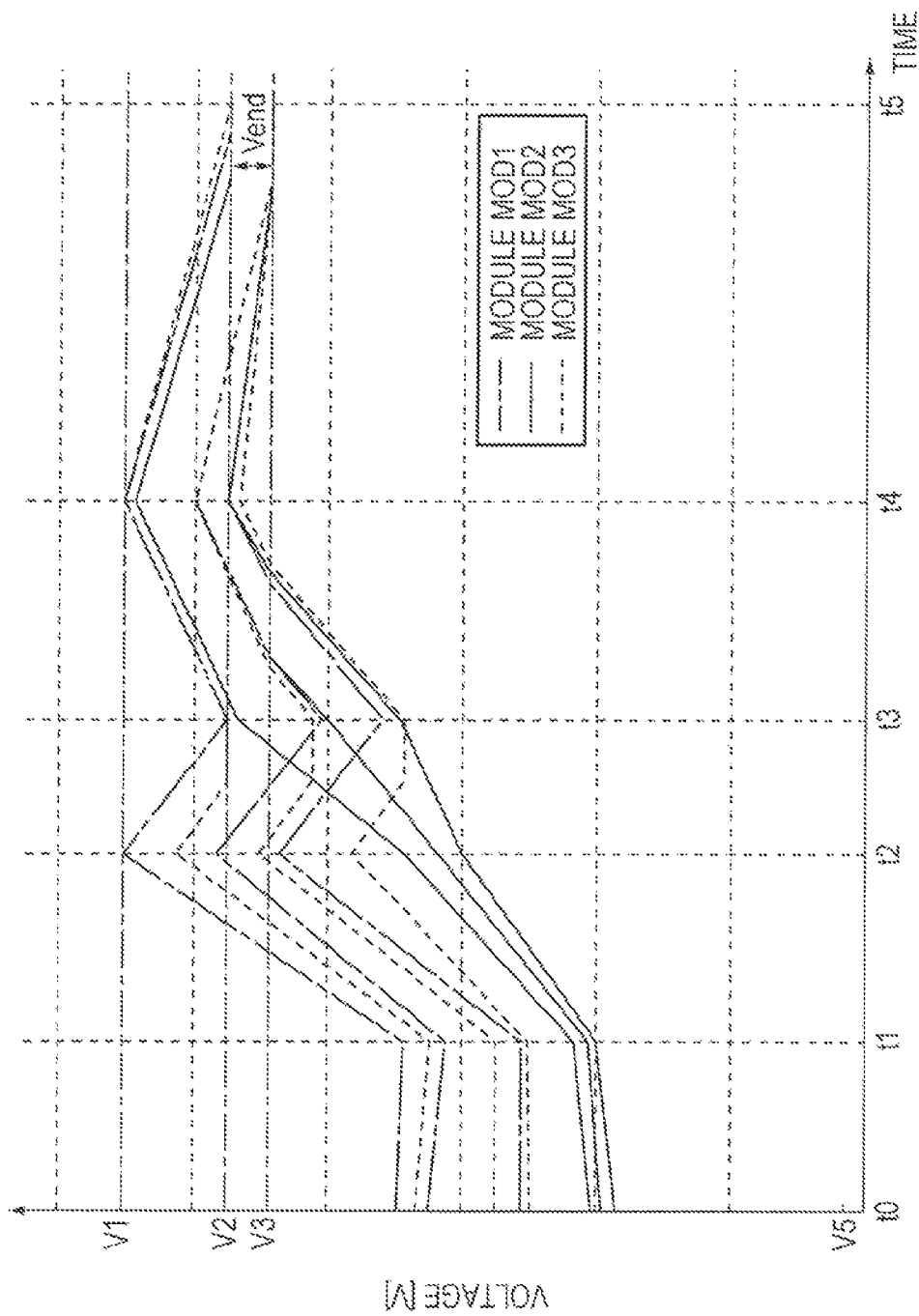
FIG. 19 is a schematic diagram illustrating changes in the voltage of battery cells in another example of the balance adjustment process in the present disclosure.

In another example illustrated in FIG. 19, only the inter-module balance adjustment is performed in advance in the charging/discharging stop period (t0 to t1), which is prior to the timing t1 at which the above-described control begins, so that the variation in voltage between the battery cells is reduced.

It is to be noted that the present disclosure can have the following configurations.

(1) A power reserve apparatus comprising:
a first module including:
a first set of battery cells; and
a first inter-cell balance adjustment unit configured to use passive balancing to reduce voltage variance among the first set of battery cells;
a second module including:
a second set of battery cells; and
a second inter-cell balance adjustment unit configured to use passive balancing to reduce voltage variance among the second set of battery cells; and an inter-module balance adjustment unit configured to use active balancing to reduce voltage variance among the first and second modules.

(2) The power reserve apparatus of (1), wherein:
the first module further includes a first battery monitoring unit configured to detect voltages of each of the battery cells within the first set; and
the second module further includes a second battery monitoring unit configured to detect voltages of each of the battery cells within the second set.

(3) The power reserve apparatus according to any one of (1) or (2), wherein:
the first module further includes a first control unit configured to determine which switches within the first inter-cell balance adjustment unit are to be switched to passively reduce voltage variance among the first set of battery cells based on the voltages detected by the first battery monitoring unit; and
the second module further includes a second control unit configured to determine which switches within the second inter-cell balance adjustment unit are to be switched to passively reduce voltage variance among the second set of battery cells based on the voltages detected by the second battery monitoring unit.

(4) The power reserve apparatus according to any one of (1), (2), and (3), further comprising a battery controller configured to:
receive a first cumulative voltage of the first set of battery cells within the first module from the first control unit;
receive a second cumulative voltage of the second set of battery cells within the second module from the second control unit; and
transmit control information to the first and second modules indicating which switches of the inter-module balance adjustment unit are to be switched to actively reduce voltage variance among the first and second modules.

(5) The power reserve apparatus according to any one of (1), (2), (3), and (4), wherein the battery controller and the first and second modules are configured for each of the battery cells, to stop charging a battery cell when the battery cell reaches a first voltage threshold.

(6) The power reserve apparatus according to any one of (1), (2), (3), (4), and (5), wherein the battery controller and the first and second modules are configured to reduce variance among the battery cells until each of the voltages of each of the battery cells are between a second voltage threshold and a third voltage threshold.

(7) The power reserve apparatus according to any one of (1), (2), (3), (4), (5), and (6), wherein a difference between the second voltage threshold and the third voltage threshold is approximately 30 millivolts.

(8) The power reserve apparatus according to any one of (1), (2), (3), (4), (5), (6), and (7), wherein the battery controller and the first and second modules are configured to perform preliminarily charging on any of the battery cells that fall below a fourth voltage threshold.

(9) The power reserve apparatus according to any one of (1), (2), (3), (4), (5), (6), (7), and (8), wherein:
the first and second modules are configured to passively reduce voltage variance using the respective first and second inter-cell balance adjustment units during a first time period, and
the battery controller is configured to actively reduce voltage variance using the inter-module balance adjustment unit during a second time period after the first time period.

(10) The power reserve apparatus according to any one of (1), (2), (3), (4), (5), (6), (7), (8) and (9), further comprising a power storage element configured to store a common power supply voltage that is substantially equal to a voltage of the modules when fully charged.

(11) The power reserve apparatus according to any one of (1), (2), (3), (4), (5), (6), (7), (8), (9) and (10), wherein:
the first module includes:
a first primary-side coil electrically connected to the power storage element and a first switch,
a first secondary-side coil electrically connected to the first set of battery cells and a second switch, and
a first magnetic core inductively coupled to the first primary-side coil and the first secondary-side coil; and
the second module includes:
a second primary-side coil electrically connected to the power storage element and a third switch,
a second secondary-side coil electrically connected to the second set of battery cells and a fourth switch, and
a second magnetic core inductively coupled to the second primary-side coil and the second secondary-side coil.

(12) The power reserve apparatus according to any one of (1), (2), (3), (4), (5), (6), (7), (8), (9), (10), and (11), wherein the battery controller is configured to indicate a sequence in which the first, second, third, and fourth switches are to be switched to actively reduce voltage variance among the first and second modules.

(13) The power reserve apparatus according to any one of (1), (2), (3), (4), (5), (6), (7), (8), (9), (10), (11), and (12), wherein the battery controller is configured to activate the first switch for a time period then activate the second switch for a second time period to charge the power storage element to reduce a voltage of the first set of battery cells when the first set of battery cells has a higher voltage than the second set of battery cells.

(14) The power reserve apparatus according to any one of (1), (2), (3), (4), (5), (6), (7), (8), (9), (10), (11), (12), and (13), wherein the battery controller is configured to activate the fourth switch for a third time period then activate the third switch for a fourth time period to increase the voltage of the second set of battery cells.

(15) A power reserve method comprising:
detecting voltages of a first set of battery cells in a first module;
detecting voltages of a second set of battery cells in a second module;
determining a first cumulative voltage of the first module based on the voltages of the first set of battery cells;
determining a second cumulative voltage of the second module based on the voltages of the second set of battery cells;
controlling a first group of switches to actively balance the cumulative voltages among the first and second modules; and
controlling a second group of switches to passively balance voltages among the battery cells within the first module and voltages among battery cells within the second module.

(16) The power reserve method according to (15), wherein actively balancing of the cumulative voltages of the first and second set of modules occurs sequentially with passively balancing the voltages among the battery cells within the first module and the voltages among battery cells within the second module.

(17) The power reserve method according to any one of (15) or (16), further comprising charging the first and second sets of battery cells.

(18) The power reserve method according to any one of (15), (16), and (17), wherein the first and second modules are actively balanced after at least the voltage of one of the battery cells within the first and second sets exceeds a first voltage threshold.

(19) The power reserve method according to any one of (15), (16), (17), and (18), wherein active balancing includes:
determining a first maximum voltage of the battery cells within the first set;
determining a second maximum voltage of the battery cells within the first set;
transferring power from the first module to the second module if the second maximum voltage is greater than a second voltage threshold and the first maximum voltage is less than the second voltage threshold; and
transferring power from the second module to the first module if the first maximum voltage is greater than the second voltage threshold and the second maximum voltage is less than the second voltage threshold.

(20) The power reserve method according to any one of (15), (16), (17), (18), and (19), wherein active balancing of the first and second sets of battery cells ends after the voltages of all of the battery cells are less than the second voltage threshold.

(21) The power reserve method according to any one of (15), (16), (17), (18), (19), and (20), wherein passive balancing is applied to each battery cell that exceeds a third threshold during changing.

(22) The power reserve method according to any one of (15), (16), (17), (18), (19), (20), and (21), wherein the first and second sets of battery cells are charged until the voltages of first and second sets of battery cells are less than the second threshold voltage, greater than a third threshold voltage, and a variance between each of the voltages of the battery cells is less than a fourth voltage threshold.

(23) The power reserve method according to any one of (15), (16), (17), (18), (19), (20), (21), and (22), wherein the fourth voltage threshold is approximately 30 millivolts.

(24) An electric vehicle comprising:
a power reserve apparatus including:
a first module including:
a first set of battery cells; and
a first inter-cell balance adjustment unit configured to use passive balancing to reduce voltage variance among the first set of battery cells;
a second module including:
a second set of battery cells; and
a second inter-cell balance adjustment unit configured to use passive balancing to reduce voltage variance among the second set of battery cells; and
an inter-module balance adjustment unit configured to use active balancing to reduce voltage variance among the first and second modules; and
a conversion apparatus configured to use power supplied from the power reserve apparatus to drive an engine and power vehicle control electronics.

(25) The electric vehicle of (24), wherein the conversion apparatus includes a motor.

(26) The electric vehicle according to any one of (24) or (25), wherein the conversion apparatus stores regenerative power to the power reserve apparatus from a rotational force of braking at least one driving wheel.

(27) The electric vehicle of according to any one of (24), (25), and (26), further comprising a charging port to receive power from an external power supply to charge the first and second sets of battery cells using passive and active balancing.

(28) The electric vehicle according to any one of (24), (25), (26), and (27), wherein:
the first module further includes a first battery monitoring unit configured to detect the voltages of each of the battery cells within the first set; and
the second module further includes a second battery monitoring unit configured to detect the voltages of each of the battery cells within the second set.

(29) The electric vehicle according to any one of (24), (25), (26), (27), and (28), wherein:
the first module further includes a first control unit configured to determine which switches within the first inter-cell balance adjustment unit are to be switched to passively reduce voltage variance among the first set of battery cells based on the voltages detected by the first battery monitoring unit while the battery cells are charging; and
the second module further includes a second control unit configured to determine which switches within the second inter-cell balance adjustment unit are to be switched to passively reduce voltage variance among the second set of battery cells based on the voltages detected by the second battery monitoring unit while the battery cells are charging.

(30) The electric vehicle according to any one of (24), (25), (26), (27), (28), and (29), further comprising a battery controller configured to:
receive a first cumulative voltage of the first set of battery cells within the first module from the first control unit;
receive a second cumulative voltage of the second set of battery cells within the second module from the second control unit; and
transmit control information to the first and second modules indicating which switches of the inter-module balance adjustment unit are to be switched to actively reduce voltage variance among the first and second modules.

(31) The electric vehicle according to any one of (24), (25), (26), (27), (28), (29), and (30), wherein the battery controller is configured to communicate a voltage of the power reserve apparatus with the vehicle control electronics.

(32) A power reserve apparatus comprising:
a plurality of battery cells;
modules, each including the plurality of battery cells;
a voltage detection unit that detects at least one cell voltage of the plurality of battery cells;
a cell equalization unit that equalizes cell voltages; and
a module equalization unit that equalizes voltages of the modules between the modules,
wherein control performed by the cell equalization unit is passive balance control, and
wherein control performed by the module equalization unit is active balance control.

(33) The power reserve apparatus according to (32), further comprising:
a control unit that generates control signals for controlling the cell equalization unit and the module equalization unit on the basis of the cell voltages.

(34) The power reserve apparatus according to (32) or (33),
wherein the control unit is configured by a first control unit provided for each of the plurality of modules and a second control unit provided for the plurality of modules in common,
wherein the cell voltage detected by the voltage detection unit is transmitted from the first control unit to the second control unit, and
wherein the second control unit generates a first control signal for controlling the cell equalization unit and a second control signal for controlling the module equalization unit.

(35) The power reserve apparatus according to (32) or (33), wherein the control unit is configured by a first control unit provided for each of the plurality of modules and a second control unit provided for the plurality of modules in common, wherein the cell voltage detected by the voltage detection unit is transmitted from the first control unit to the second control unit, wherein the first control unit generates a first control signal for controlling the cell equalization unit, and wherein the second control unit generates a second control signal for controlling the module equalization unit.

(36) The power reserve apparatus according to any of (32), (33), (34), and (35), wherein the control unit performs the control performed by the cell equalization unit and the module equalization unit during charging.

(37) The power reserve apparatus according to any of (32), (33), (34), (35), and (36), wherein a first threshold value V1, a second threshold value V2 smaller than the first threshold value V1, and a third threshold value V3 smaller than the second threshold value V2 are set, and wherein the control performed by the cell equalization unit and the module equalization unit is repeated until the cell voltages fall between the second threshold value V2 and the third threshold value V3.

(38) The power reserve apparatus according to any of (32), (33), (34), (35), (36), and (37), wherein a first threshold value V1, a second threshold value V2 smaller than the first threshold value V1, and a third threshold value V3 smaller than the second threshold value V2 are set, and wherein the control performed by the module equalization unit begins when a maximum cell voltage among the cell voltages of the plurality of battery cells has reached the first threshold value V1.

(39) The power reserve apparatus according to any of (32), (33), (34), (35), (36), (37), and (38), wherein a first threshold value V1, a second threshold value V2 smaller than the first threshold value V1, and a third threshold value V3 smaller than the second threshold value V2 are set, and wherein the control performed by the cell equalization unit begins when the cell voltages have reached the third threshold value V3.

(40) The power reserve apparatus according to any of (32), (33), (34), (35), (36), (37), (38), and (39), wherein the control performed by the cell equalization unit begins when the cell voltages have reached the third threshold value V3.

(41) The power reserve apparatus according to any of (32), (33), (34), (35), (36), (37), (38), (39), and (40), wherein, after the control performed by the module equalization unit begins, when at least one cell voltage has reached a fourth threshold value V4 smaller than the first threshold value V1, the at least one cell voltage is kept constant.

(42) The power reserve apparatus according to any of (32), (33), (34), (35), (36), (37), (38), (39), (40), and (41), wherein the fourth threshold value V4 is equal to the second threshold value V2.

(43) The power reserve apparatus according to any of (32), (33), (34), (35), (36), (37), (38), (39), (40), (41), and (42), wherein the control performed by the module equalization unit begins, and wherein, when the maximum cell voltage has reached the second threshold value V2 after the first threshold value V1 is reached, the control performed by the module equalization unit ends.

(44) The power reserve apparatus according to any of (32), (33), (34), (35), (36), (37), (38), (39), (40), (41), (42), and (43), wherein the module equalization unit includes a series circuit configured by a first coil and a first switching element connected parallel to a series connection of the plurality of modules, a second coil electromagnetically coupled with the first coil, and a second switching element connected in series with the second coil, and wherein the control unit individually controls the first and second switching elements.

(45) The power reserve apparatus according to any of (32), (33), (34), (35), (36), (37), (38), (39), (40), (41), (42), (43), and (44), wherein power is obtained from at least one first module among the plurality of modules whose maximum cell voltage among the plurality of battery cells is higher than a maximum cell voltage among the plurality of battery cells in another module by first and second switching elements connected to the at least first module, and wherein the obtained power is supplied to at least one second module among the plurality of modules whose maximum cell voltage among the plurality of battery cells is lower than a maximum cell voltage among the plurality of battery cells in another module from first and second switching elements connected to the at least one second module.

(46) The power reserve apparatus according to any of (32), (33), (34), (35), (36), (37), (38), (39), (40), (41), (42), (43), (44), and (45), wherein power is obtained from at least one first module among the plurality of modules whose maximum cell voltage among the plurality of battery cells is higher than the second threshold value V2 by first and second switching elements connected to the at least one first module, and wherein the obtained power is supplied to at least one second module among the plurality of modules whose maximum cell voltage among the plurality of battery cells is lower than the second threshold value V2 from first and second switching elements connected to the at least one second module.

(47) A power system comprising:

a power information transmission/reception unit that transmits a signal to or receives a signal from another device through a network, wherein the transmission/reception unit causes the power reserve apparatus according to (32) to charge or discharge on the basis of received information.

(48) An electric vehicle comprising:

a conversion apparatus that converts power supplied from the power reserve apparatus according to (32) into driving force of the vehicle and a control apparatus that processes information relating to vehicle control on the basis of information relating to the power reserve apparatus.

"Power Reserve Apparatus in House as Application Example"

Figure 20:
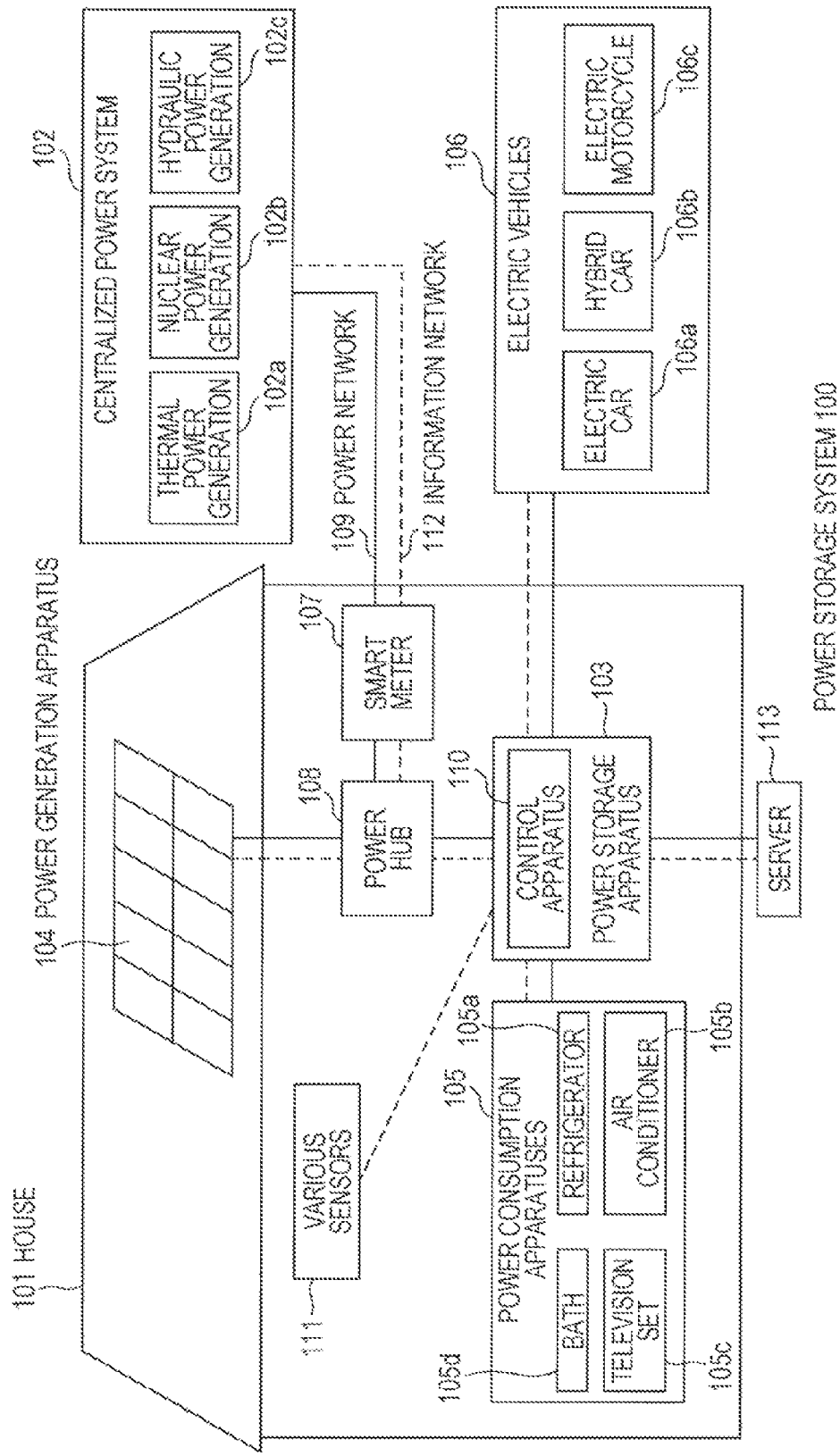
FIG. 20 is a block diagram of a first example of an application example of a power storage system including an inter-module balance circuit in the present disclosure.

An example in which the present disclosure is applied to a power reserve apparatus used in a house will be described with reference to FIG. 20. For example, in a power reserve apparatus 100 used in a house 101, a centralized power system 102 such as thermal power generation 102*a*, nuclear power generation 102*b*, or hydraulic power generation 102*c* supplies power to a power storage apparatus 103 through a power network 109, an information network 112, a smart meter 107, a power hub 108, and the like. At the same time, an independent power supply such as a domestic generation apparatus 104 supplies power to the power storage apparatus 103. The power supplied to the power storage apparatus 103 is stored. Power used in the house 101 is provided using the power storage apparatus 103. The same power reserve apparatus may be used not only in the house 101 but also in a building.

In the house 101, the generation apparatus 104, power consumption apparatuses 105, the power storage apparatus 103, a control apparatus 110 that controls various apparatuses, the smart meter 107, and sensors 111 that obtain various pieces of information are provided. These apparatuses are connected to one another by the power network 109 and the information network 112. As the generation apparatus 104, solar cells, fuel cells, or the like are utilized, and generated power is supplied to the power consumption apparatuses 105 and/or the power storage apparatus 103. The power consumption apparatuses 105 are a refrigerator 105*a*, an air conditioning apparatus 105*b*, a television receiver 105*c*, a bath 105*d*, and the like. Furthermore, the power consumption apparatuses 105 include electric vehicles 106. The electric vehicles 106 are an electric car 106*a*, a hybrid car 106*b*, and an electric motorcycle 106*c*.

The above-described battery unit in the present disclosure is applied to the power storage apparatus 103. The power storage apparatus 103 is configured by a secondary battery or a capacitor. For example, the power storage apparatus 103 is configured by a lithium-ion battery. The lithium-ion battery may be of a fixed type or may be one that is used in the electric vehicles 106. The smart meter 107 has functions of measuring the amount of commercial power used and transmitting the measured amount to a power company. The power network 109 may be any of, or a combination between, direct-current power feed, alternating-current power feed, and non-contact power feed.

The various sensors 111 are, for example, a human detection sensor, an illuminance sensor, an object detection sensor, a power consumption sensor, a vibration sensor, a contact sensor, a temperature sensor, an infrared sensor, and the like. Information obtained by the various sensors 111 is transmitted to the control apparatus 110. Energy consumption can be kept at minimum by automatically controlling the power consumption apparatuses 105 while detecting meteorological conditions, the states of persons, and the like using the information from the sensors 111. Furthermore, the control apparatus 110 can transmit information relating to the house 101 to an external power company or the like through the Internet.

The power hub 108 performs processes such as division of a power line and direct-current/alternating-current conversion. As communication methods used by the information network 112 connected to the control apparatus 110, a method in which a communication interface such as a UART (Universal Asynchronous Receiver-Transceiver) is used and a method in which a sensor network according to a wireless communication standard such as Bluetooth, ZigBee, or Wi-Fi is utilized are available. The Bluetooth method is applied to multimedia communication, and communication of one-to-many connections is possible. In ZigBee, the physical layer according to IEEE (Institute of Electrical and Electronics Engineers) 802.15.4 is used. IEEE 802.15.4 is the name of a short-range wireless network standard called PAN (Personal Area Network) or W (Wireless) PAN.

The control apparatus 110 is connected to an external server 113. The server 113 may be managed by any of the house 101, the power company, and a service provider. Information transmitted or received by the server 113 is, for example, power consumption information, life pattern information, the power rate, whether information, natural disaster information, or information relating to a power transaction. These pieces of information may be transmitted from, or received by, a domestic power consumption apparatus (for example, the television receiver), or may be transmitted from, or received by, an apparatus (for example, a mobile telephone or the like) outside the house. These pieces of information may be displayed on a device having a display function, such as, for example, the television receiver, the mobile telephone, or a PDA (Personal Digital Assistant).

The control apparatus 110 that controls various components is configured by a CPU (Central Processing Unit), a RAM (Random Access Memory), a ROM (Read Only Memory), and the like, and stored in the power storage apparatus 103 in this example. The control apparatus 110 is connected to the power storage apparatus 103, the domestic generation apparatus 104, the power consumption apparatuses 105, the various sensors 111, and the server 113 by the information network 112, and, for example, has a function of adjusting the amount of commercial power to be used and the amount of power to be generated. It is to be noted that a function of making a power transaction in a power market or the like may also be included.

As described above, power can be stored not only in the centralized power system 102 such as the thermal power generation 102*a*, the nuclear power generation 102*b*, or the hydraulic power generation 102*c*, but also in the power storage apparatus 103 in the form of power generated by the domestic power generation apparatus 104 (solar photovoltaic power generation or wind power generation). Therefore, even if the power generated by the domestic power generation apparatus 104 varies, the amount of power to be transmitted to the outside can be kept constant, only necessary power can be discharged, or other types of control can be performed. For example, the following usage is possible: power obtained by the solar photovoltaic power generation is stored in the power storage apparatus 103 and midnight power, whose cost is low, is stored in the power storage apparatus 103 at night, while the power stored in the power storage apparatus 103 is discharged during the day, when cost is high.

It is to be noted that although an example in which the control apparatus 110 is stored in the power storage apparatus 103 has been described, the control apparatus 110 may be stored in the smart meter 107 or may be configured independently. Furthermore, the power reverse apparatus 100 may be used for a plurality of houses in an apartment area, or may be used for a plurality of detached houses "Power Reserve Apparatus in Vehicle as Application Example"

Figure 21:
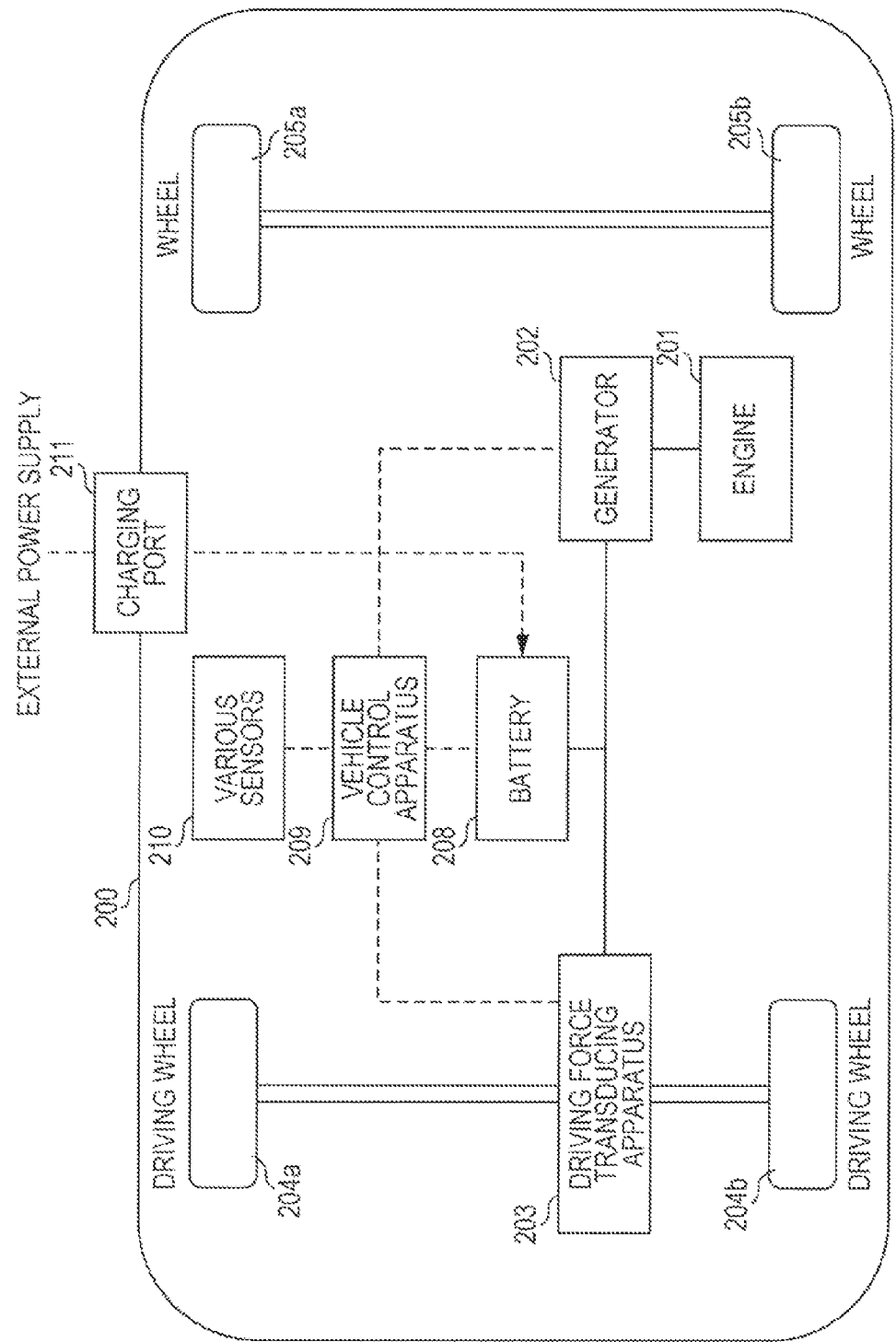
FIG. 21 is a block diagram of a second example of an application example of the power storage system including the inter-module balance circuit in the present disclosure.

An example in which the present disclosure is applied to a power reserve apparatus used in a vehicle will be described with reference to FIG. 21. FIG. 21 schematically illustrates an example of the configuration of a hybrid car adopting a series hybrid system to which the present disclosure is applied. The series hybrid system is a car that runs with a power driving force transducing apparatus using power generated by a generator driven by an engine or the same power that has been stored in a battery.

In this hybrid car 200, an engine 201, a generator 202, a power driving force transducing apparatus 203, a driving wheel 204a, a driving wheel 204b, a wheel 205a, a wheel 205b, a battery 208, a vehicle control apparatus 209, various sensors 210, and a charging port 211 are mounted. The above-described battery unit in the present disclosure is applied to the battery 208.

The hybrid car 200 runs using the power driving force transducing apparatus 203 as the power source. An example of the power driving force transducing apparatus 203 is a motor. The power driving force transducing apparatus 203 operates using power stored in the battery 208, and the rotational force of the power driving force transducing apparatus 203 is transmitted to the driving wheels 204a and 204b. It is to be noted that, by adopting direct current-alternating current (DC-AC) conversion or reverse conversion (AC-DC conversion) at a necessary point, the power driving force transducing apparatus 203 may be adopted regardless of the power driving force transducing apparatus 203 being an alternating-current motor or a direct-current motor. The various sensors 210 control the engine speed through the vehicle control apparatus 209 and controls the opening of a throttle valve (throttle opening), which is not illustrated. The various sensors 210 include a speed sensor, an acceleration sensor, and an engine speed sensor.

The rotational force of the engine 201 is transmitted to the generator 202, and the power generated by the generator 202 using the rotational force can be stored in the battery 208.

When the speed of the hybrid car is decreased by a braking mechanism, which is not illustrated, the resisting force at the time of the decrease in speed is added to the power driving force transducing apparatus 203 as rotational force, and regenerative power generated by the power driving force transducing apparatus 203 using the rotational force is stored in the battery 208.

When connected to a power supply outside the hybrid car, the battery 208 can receive supply of power from the external power supply using the charging port 211 as an input port and store the received power. Although not illustrated, an information processing apparatus that processes information relating to vehicle control on the basis of information relating to the secondary battery may be included. Such an information processing apparatus may be, for example, an information processing apparatus that displays the remaining amount of power in the battery on the basis of information relating to the remaining amount of power in the battery.

It is to be noted that, in the above description, a series hybrid car that runs with a motor using power generated by a generator driven by an engine or the same power that has been stored in a battery has been described as an example. However, the present disclosure can be effectively applied to a parallel hybrid car that uses three methods, that is, a run using only the engine, a run using only the motor, and a run using both the engine and the motor, while switching the method as necessary. Furthermore, the present disclosure can be effectively applied to a so-called electric vehicle that runs using only a driving motor without using an engine.

"Modifications"

Although the embodiments of the present disclosure have been specifically described, the present disclosure is not limited to the above-described embodiments, and various modifications based on the technical idea of the present disclosure are possible. For example, the configurations, the methods, the processes, the shapes, the materials, and the values described in the above embodiments are merely examples, and configurations, methods, processes, shapes, materials, and values different from these can be used as necessary.

In addition, the configurations, the methods, the processes, the shapes, the materials, and the values described in the above embodiments may be combined with one another insofar as the scope of the present disclosure is not deviated from.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

MOD, MOD1 to MODN power storage module
ICNT control box
CNT controller of each power storage module
ICNT control box
B1 to Bn battery block
BB1 to BBn battery unit
ISC1 to ISCn insulation unit
COM1 to COMn communication unit
21 multilayer wiring board
23, 24 printed board antenna
LY1 to LY4 wiring layer
W1 to W14 primary-side coil
S1 to S14 primary-side switch
W01 to W014 secondary-side coil
S01 to S014 secondary-side switch
T1 to T14 flyback transformer
Cl+, Cl− common power supply line
CV common power supply voltage
51 power storage element

The invention claimed is:

1. An apparatus comprising:
a first module including:
a first set of battery cells; and
a first inter-cell balance adjustment unit configured to reduce voltage variance among the first set of battery cells;
a second module including:
a second set of battery cells; and
a second inter-cell balance adjustment unit configured to reduce voltage variance among the second set of battery cells;
wherein the first module further includes a first battery monitoring unit configured to detect voltages of each of the battery cells within the first set and the second module further includes a second battery monitoring unit configured to detect voltages of each of the battery cells within the second set,
wherein the first module further includes a first control unit configured to determine which switches within the first inter-cell balance adjustment unit are to be switched to reduce voltage variance among the first set of battery cells based on the voltages detected by the first battery monitoring unit and the second module further includes a second control unit configured to determine which switches within the second inter-cell balance adjustment unit are to be switched to reduce voltage variance among the second set of battery cells based on the voltages detected by the second battery monitoring unit, wherein the first module includes a first primary-side coil electrically connected to the power storage element and a first switch, a first secondary-side coil electrically connected to the first set of battery cells and a second switch, and a first magnetic core inductively coupled to the first primary-side coil and the first secondary-side coil; and wherein the second module includes a second primary-side coil electrically connected to the power storage element and a third switch, a second secondary-side coil electrically connected to the second set of battery cells and a fourth switch, and a second magnetic core inductively coupled to the second primary-side coil and the second secondary-side coil.

2. The apparatus of claim 1, further comprising a battery controller configured to:

receive a first cumulative voltage of the first set of battery cells within the first module from the first control unit;

receive a second cumulative voltage of the second set of battery cells within the second module from the second control unit.

3. The apparatus of claim 2, wherein the battery controller and the first and second modules are configured for each of the battery cells, to stop charging a battery cell when the battery cell reaches a first voltage threshold.

4. The apparatus of claim 2, wherein the battery controller and the first and second modules are configured to reduce variance among the battery cells until each of the voltages of each of the battery cells are between a second voltage threshold and a third voltage threshold.

5. The apparatus of claim 4, wherein a difference between the second voltage threshold and the third voltage threshold is approximately 30 millivolts.

6. The apparatus of claim 2, wherein the battery controller and the first and second modules are configured to perform preliminarily charging on any of the battery cells that fall below a fourth voltage threshold.

7. The apparatus of claim 2, further comprising a power storage element configured to store a common power supply voltage that is substantially equal to a voltage of the modules when fully charged.

8. The apparatus of claim 1, wherein the battery controller is configured to activate the first switch for a first time period then activate the second switch for a second time period to charge the power storage element to reduce a voltage of the first set of battery cells when the first set of battery cells has a higher voltage than the second set of battery cells.

9. The apparatus of claim 8, wherein the battery controller is configured to activate the fourth switch for a third time period then activate the third switch for a fourth time period to increase the voltage of the second set of battery cells.

* * * * *